(12) United States Patent
Kaneko et al.

(10) Patent No.: US 9,551,327 B2
(45) Date of Patent: Jan. 24, 2017

(54) POWER GENERATION SWITCH APPARATUS

(71) Applicants: MITSUMI ELECTRIC CO., LTD., Tokyo (JP); Honda Access Corp., Saitama (JP)

(72) Inventors: Toshio Kaneko, Tokyo (JP); Nobutaka Tsuneyoshi, Tokyo (JP); Hidetaka Umeoka, Saitama (JP)

(73) Assignees: MITSUMI ELECTRIC CO., LTD., Tokyo (JP); Honda Access Corp., Saitama (JP)

( * ) Notice: Subject to any disclaimer, the term of this patent is extended or adjusted under 35 U.S.C. 154(b) by 25 days.

(21) Appl. No.: 14/386,856

(22) PCT Filed: Mar. 22, 2013

(86) PCT No.: PCT/JP2013/058280
§ 371 (c)(1),
(2) Date: Sep. 22, 2014

(87) PCT Pub. No.: WO2013/141354
PCT Pub. Date: Sep. 26, 2013

(65) Prior Publication Data
US 2015/0054289 A1    Feb. 26, 2015

(30) Foreign Application Priority Data

Mar. 22, 2012  (JP) .................................. 2012-066411
Oct. 1, 2012  (JP) .................................. 2012-219864

(51) Int. Cl.
*H02K 7/18* (2006.01)
*F03G 5/06* (2006.01)
(Continued)

(52) U.S. Cl.
CPC ............... *F03G 5/06* (2013.01); *G06F 3/0202* (2013.01); *G08C 17/02* (2013.01); *H02K 7/1853* (2013.01); *H01H 2239/076* (2013.01)

(58) Field of Classification Search
CPC .. G08C 17/02; G06F 3/0202; H01H 2239/076
See application file for complete search history.

(56) References Cited

U.S. PATENT DOCUMENTS

2003/0143963 A1    7/2003  Pistor et al.
2014/0353135 A1*  12/2014 Erdmann ............... H01H 25/06
                                                              200/518

FOREIGN PATENT DOCUMENTS

EP    1473748    11/2004
EP    2109086    10/2009
(Continued)

OTHER PUBLICATIONS

Extended European Search Report dated Sep. 22, 2015.
International Search Report mailed on Jun. 18, 2013.
Japanese Office Action mailed Feb. 18, 2014.

*Primary Examiner* — Nabil Syed
(74) *Attorney, Agent, or Firm* — IPUSA, PLLC

(57) ABSTRACT

A power generation switch apparatus including multiple switch keys, a power generation apparatus that is driven to perform power generation by an operation force applied to the multiple switch keys, multiple switches being supplied with an electric power generated by the power generation apparatus and performing a switching movement by an operation of the multiple switch keys, and a switch signal transmission circuit being driven by the electric power from the power generation apparatus and outputting multiple switch signals that are different from each other in correspondence with the switching movement of the multiple switches.

5 Claims, 26 Drawing Sheets

(51) Int. Cl.
*G08C 17/02* (2006.01)
*G06F 3/02* (2006.01)

(56) References Cited

FOREIGN PATENT DOCUMENTS

| | | | |
|---|---|---|---|
| FR | EP 2109086 A1 * | 10/2009 | ............ G08C 17/02 |
| JP | H10-050354 | 2/1998 | |
| JP | 2003-233448 | 8/2003 | |
| JP | 2003-534704 | 11/2003 | |
| JP | 2005-245115 | 9/2005 | |
| JP | 2011-172112 | 9/2011 | |
| WO | 2010/116451 | 10/2010 | |

\* cited by examiner

FIG.8

| | SWITCH KEY 11 | SWITCH KEY 12 | SWITCH KEY 13 | SWITCH KEY 14 | SWITCH KEY 15 | SWITCH KEY 16 |
|---|---|---|---|---|---|---|
| SWITCH SW1 | ON | OFF | OFF | OFF | OFF | OFF |
| SWITCH SW2 | OFF | OFF | ON | OFF | OFF | OFF |
| SWITCH SW3 | OFF | OFF | OFF | ON | OFF | OFF |
| SWITCH SW4 | OFF | OFF | OFF | OFF | OFF | ON |
| SWITCH SW5 | OFF | OFF | OFF | ON | ON | ON |
| ELECTROMOTIVE FORCE | ON | ON | ON | ON | ON | ON |
| FUNCTION | CHANGE CH (−) | CHANGE VOLUME (−) | SWITCH MODE (REVERSE DIRECTION) | CHANGE CH (+) | CHANGE VOLUME (+) | SWITCH MODE (FORWARD DIRECTION) |

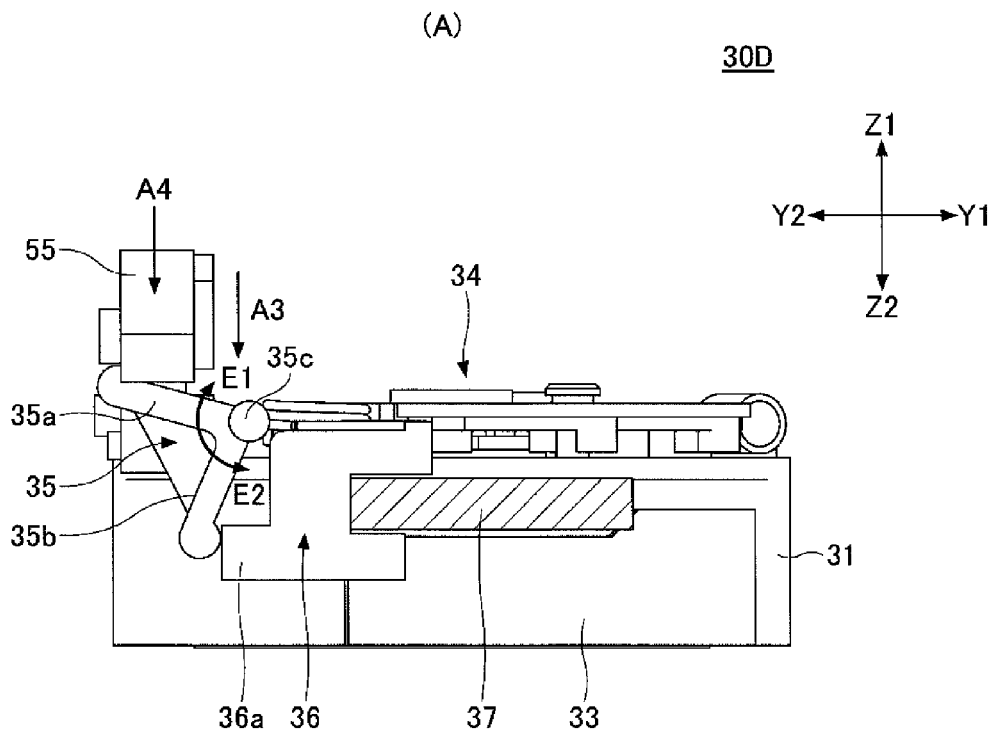
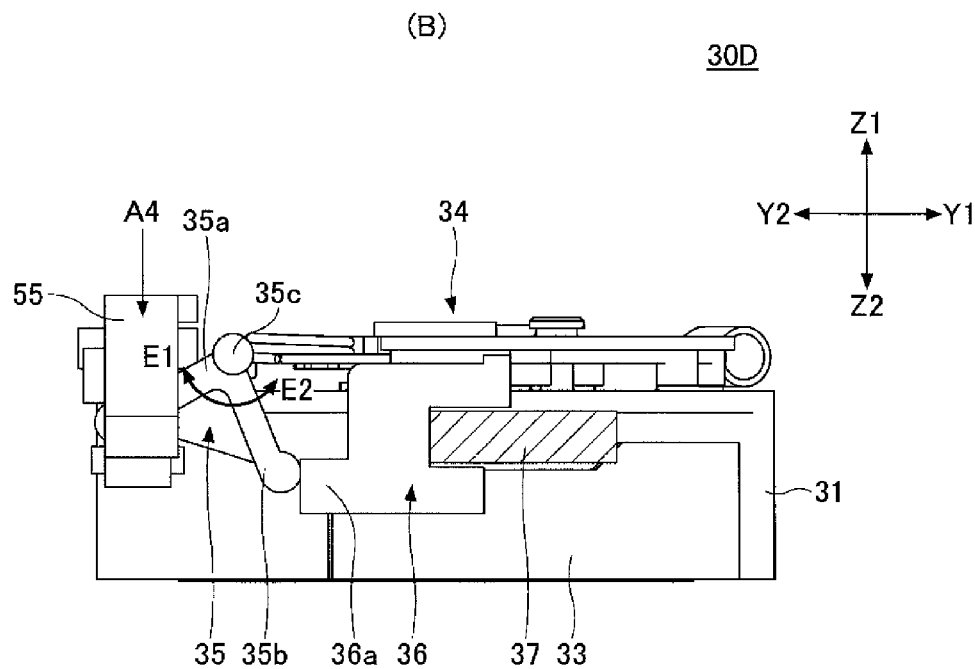
FIG.22

POWER GENERATION SWITCH APPARATUS

TECHNICAL FIELD

The present invention relates to a power generation switch apparatus including multiple switch keys.

BACKGROUND ART

A wireless switch for switching on/off an electronic device is known. The wireless switch can be positioned at a location separated from the electronic device. Therefore, in a case where the electronic device and the switch are assembled together to form a single apparatus, the degree of freedom of positioning the electronic device and the switch is increased. Therefore, in a case where there are constraints regarding, for example, the location for positioning the electronic device and the switch, it is convenient to use a wireless switch.

Using a dry-cell battery as a power source of a wireless switch may be troublesome because replacement of the dry-cell battery is necessary. Therefore, a power generation switch apparatus for improving usability is proposed in which the power generation apparatus is provided inside a wireless switch (See Patent Document 1). Further, there is a growing tendency in the number of operation switch keys (the part that is operated with fingers) due to the increasing number of functions of electronic devices.

RELATED PATENT DOCUMENT

Patent Document

Patent Document 1: Japanese National Publication of International Patent Application No. 2003-534704

DISCLOSURE OF THE INVENTION

Problem to be Solved by Invention

A conventional power generation switch apparatus typically includes 1 switch key and 1 power generation device and is configured to respond only to a single input operation. In a case of using a wireless switch that requires multiple input operations (e.g., an ON operation and an OFF operation), a power generation apparatus for the ON operation and a power generation apparatus for the OFF operation would be necessary. Therefore, the conventional power generation switch apparatus has problems such as having a complicated apparatus structure and requiring a large size. These problems become notable as the number of operation switch keys increase together with the increase in the number of functions of the electronic device.

Thus, it is an object of the present invention to provide a power generation switch apparatus having a simplified apparatus structure and a reduced size.

Means for Solving Problem

According to an embodiment of the present invention, there is provided a power generation switch apparatus including a plurality of switch keys; a power generation apparatus that is driven to perform power generation by an operation force applied to the switch keys; a plurality of switches being supplied with electric power generated by the power generation apparatus and performing a switching movement by an operation of the switch keys; and a switch signal transmission circuit being driven by the electric power from the power generation apparatus and outputting a plurality of switch signals that are different from each other in correspondence with the switching movement of the plurality of switches.

Effect of Invention

With an embodiment of the present invention, multiple switch signals corresponding to switch movements of multiple switches are generated by driving a switch signal transmission circuit with power supplied from a single power generation apparatus. Accordingly, there is no need to provide a power generation apparatus for each switch. Thus, simplification and size-reduction of a power generation switch apparatus can be achieved.

BRIEF DESCRIPTION OF THE DRAWINGS

FIG. 8 is a diagram illustrating a relationship of operations of switch keys and on/off switching;

FIG. 22(A) is a front view of a power generation apparatus before being operated, and FIG. 22(B) is a front view of a power generation apparatus after being operated;

EMBODIMENT FOR CARRYING OUT INVENTION

In the following, embodiments of the present invention are described with reference to the accompanying drawings.

Figure 1:
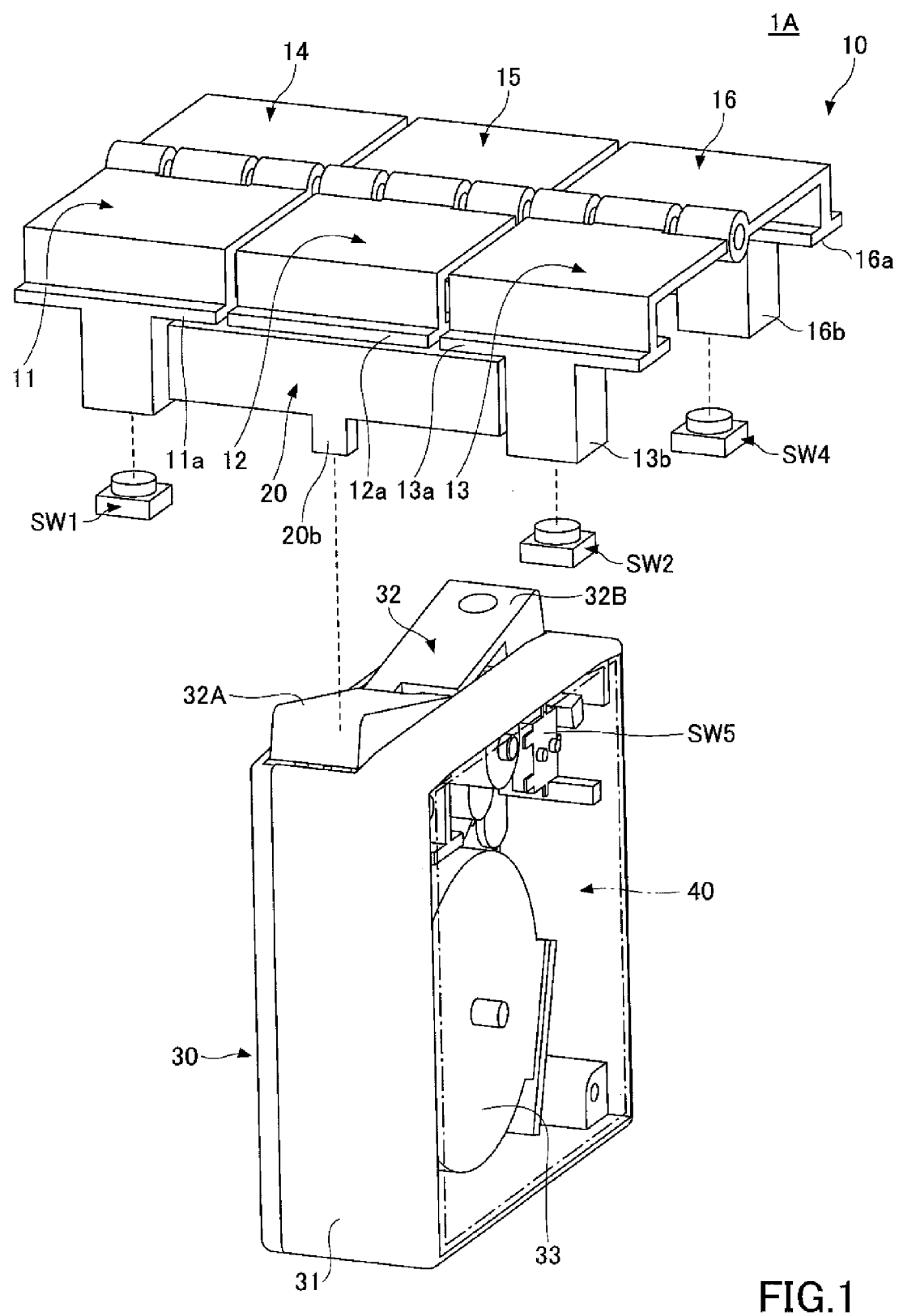
FIG. 1 is a perspective view illustrating a state where a switch mechanism of a power generation switch apparatus of a first embodiment is separated from a power generation apparatus.
Figure 2:
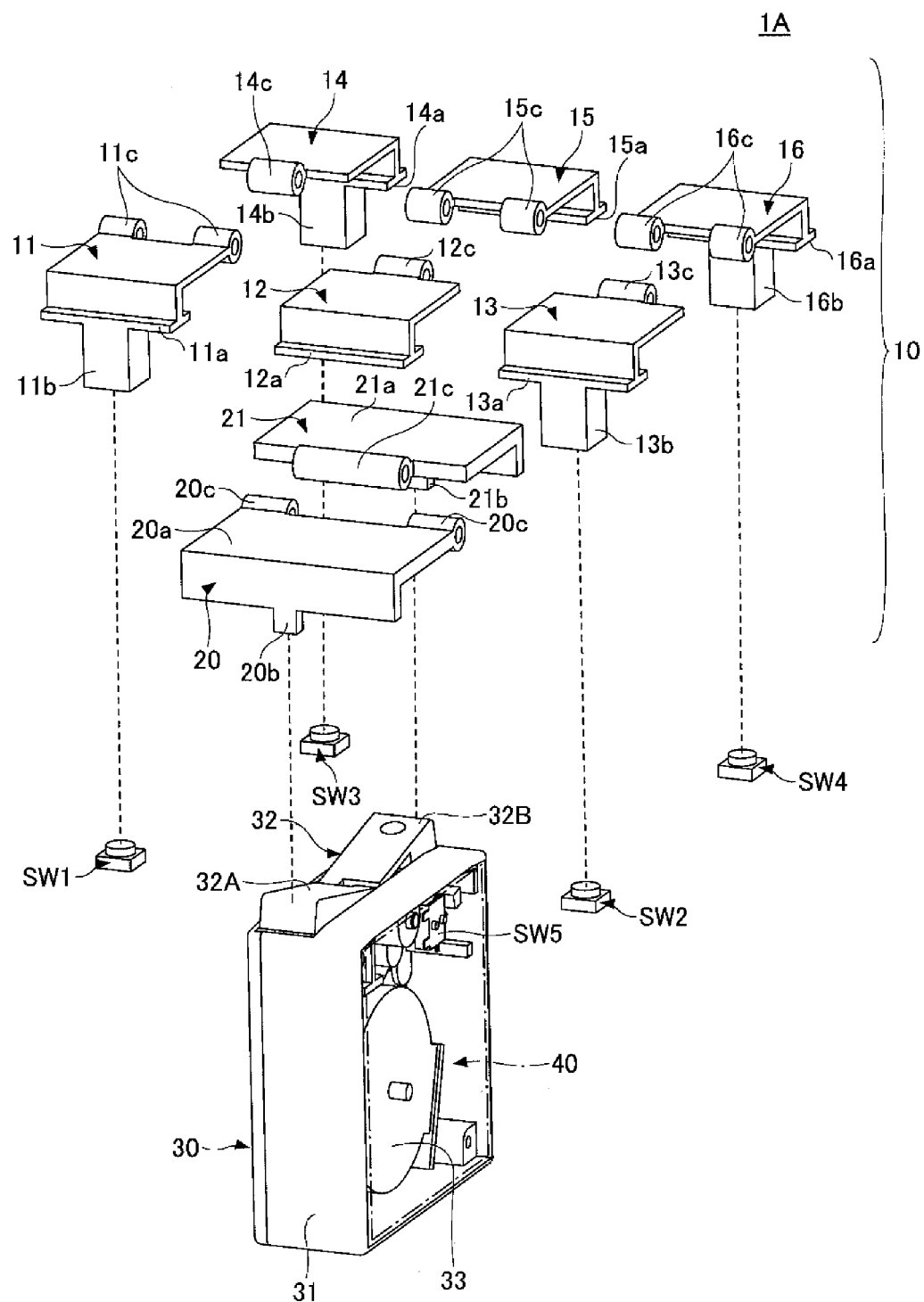
FIG. 2 is an exploded perspective view of the power generation switch apparatus of the first embodiment.
Figure 3:
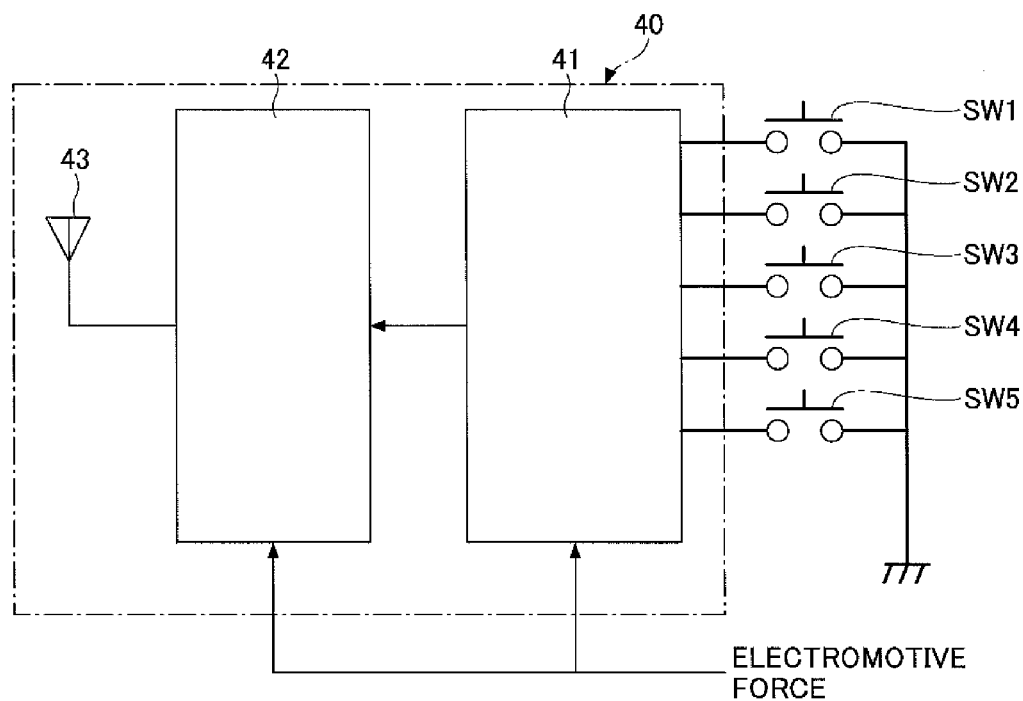
FIG. 3 is a circuit diagram of multiple switches and a switch signal generation part mounted on the power generation switch apparatus of the first embodiment.

FIGS. 1-3 are diagrams for describing a power generation switch apparatus 1A according to a first embodiment of the present invention. FIG. 1 is a perspective view illustrating a state where a switch mechanism 10 is separated from a power generation apparatus 30. FIG. 2 is an exploded perspective view of the power generation switch apparatus 1A. FIG. 3 is a diagram illustrating an electric circuit mounted on the power generation switch apparatus 1A.

The power generation switch apparatus 1A transmits a switch signal to an electronic device (not illustrated). When one of the switch keys 11-16 is operated, the power generation switch apparatus 1A wirelessly transmits a switch signal corresponding to the operated one of the switch keys 11-16 to the electronic device. The electronic device performs a movement corresponding to the transmitted switch signal.

The power generation switch apparatus 1A of this embodiment is a so-called batteryless switch apparatus installed with the power generation apparatus 30. That is, when the switch keys 11-16 of the power generation apparatus 1A are operated, the power generation apparatus 30 performs power generation in correspondence with the movements of the switch keys 11-16. The power generation switch apparatus 1A wirelessly transmits a switch signal by using electric power generated by the power generation apparatus 30.

The power generation apparatus 30 has, for example, an operation lever 32, a power generator 33, and a built-in switch SW5 provided in a rectangular-shaped housing 31. The operation lever 32 is provided in a manner projecting from an upper surface of the housing 31. The operation lever 32 includes a first operation part 32A and a second operation part 32B that project from the housing 31. A center portion of the operation lever 32 is rotatably supported with respect to the housing 31. Accordingly, the operation lever 32 is attached so that the operation lever can oscillate with respect to the housing 31.

The power generator 33 performs power generation when the operation lever 32 is operated. In this embodiment, a motor is used as the power generator 33. The operation lever 32 and the power generator 33 are coupled by way of a link mechanism (not illustrated). The power generator rotates and generates power by operating the operation lever 32 (generation of induced electromotive force). That is, the power generator 33 is driven by using the pressing force exerted to the operation lever 32 as a motive force. Thereby, the power generator 33 generates electric power.

A circuit substrate 40 is mounted to an opening portion of the housing 31. For example, a switch control circuit 41, a transmission circuit 42, and an antenna 43 illustrated in FIG. 3 are provided in the circuit substrate 40. The switch control circuit 41, the transmission circuit 42, and the antenna 43 correspond to a switch signal transmission circuit or a switch signal transmission part. The electric power generated by the power generator 33 is supplied to the switch control circuit 41 and the transmission circuit 42 formed in the circuit substrate 40.

The switch control circuit 41 is connected to the below-described switches SW1-SW4 and the built-in switch SW5. The switch control circuit 41 is responsive to switch movements of the multiple switches SW1-SW5 and outputs multiple switch signals that are different from each other in correspondence with the multiple switches SW1-SW5.

For example, in a case where the switch SW1 among the switches SW1-SW5 is operated, the switch control circuit 41 identifies the operated switch SW. Then, when the switch control circuit 41 determines that the operated switch SW is the switch SW1, the switch control circuit 41 outputs a switch signal corresponding to the switch SW1 to the transmission circuit 42.

The transmission circuit 42 is a circuit that generates a switch signal to an electronic device. When the transmission circuit 42 receives the switch signal transmitted from the switch control circuit 41, the transmission circuit 42 transmits a switch signal having a frequency corresponding to the transmitted switch signal from the antenna 43 to the electronic device. The electronic device that has received the switch signal performs a movement corresponding to the received switch signal.

The built-in switch SW5 is configured to be able to engage the second operation part 32B. When the second operation part 32B is not operated, the second operation part 32B is in a state separated from the built-in switch SW5. Therefore, the built-in switch SW5 in an OFF state when the second operation part 32B is not operated.

On the other hand, when the second operation part 32B is operated, the second operation part 32B engages the built-in switch SW5. Therefore, the built-in switch SW5 is in an ON state when the second operation part 32B is operated.

The switch mechanism 10 is arranged in a position facing the operation lever 32 of the power generation apparatus 30. The switch mechanism 10 is a link mechanism including six switch keys 11-16 and two coupling arms 20, 21.

Each of the switch keys 11-16 has its upper surface operated by an operator. A side surface of each of the switch keys 11-16 has an L-shape. Further, the switch keys 11-16 have respective flange parts 11a-16a provided at their end parts extending downward. Further, the switch keys 11-16 have shaft parts 11c-16c formed at their end parts extending in a horizontal direction. The switch keys 11-16 include operation protrusions 11b, 13b, 14b, and 16b that extend from the flange parts 11a, 13a, 14a, and 16a, respectively.

In the switch keys 11-16, the shaft part 11c and the shaft part 14c are combined with each other, the shaft part 12c and the shaft part 15c are combined with each other, and the shaft part 13c and the shaft part 16c are combined with each other. In this combined state, each of the switch keys 11-16 can be coupled by inserting a support shaft (not illustrated) into the combined shaft parts 11c-16c. In this state where the switch keys 11-16 are coupled by way of the support shafts, each of the switch keys 11-16 can rotate about a corresponding support shaft.

The coupling arms 20, 21 are provided between the switch keys 11-16 and the power generation apparatus 30. The coupling arms 20, 21 couple the switch keys 11-16 and the power generation apparatus 30 to each other, and function to cause the power generation apparatus 30 to generate power whenever any of the switch keys 11-16 is operated.

The coupling arms 20, 21 also have L-shapes from a side view. Shaft parts 20c, 21c are formed at end parts of target operation surfaces 20a, 21a that extend in a horizontal direction of the coupling arms 20, 21.

In a state where the shaft parts 20c, 21c are combined, the coupling arms 20, 21 can be coupled and integrated with each other by inserting a support shaft (not illustrated) into the shaft parts 20c, 21c. In a state where the coupling arms 20, 21 are coupled by way of the support shaft, the coupling arms 20, 21 can rotate about the support shaft.

As described above, the coupling arms 20, 21 are provided between the switch keys 11-16 and the power generation apparatus 30. In the state where the switch keys 11-16 and the coupling arms 20, 21 are assembled, the flange parts 11a, 12a, 13a of the switch keys 11, 12, 13 engage with the target operation surface 20a of the coupling arm 20, and the flange parts 14a, 15a, 16a of the switch keys 14, 15, 16 engage with the target operation surface 21a of the coupling arm 21.

Accordingly, regardless of which switch key of the switch keys 11-13 is operated, the operated switch key exerts pressure to the target operation surface 20a. Thereby, the coupling arm 20 is rotated. Similarly, regardless of which switch key of the switch keys 14-16 is operated, the operated switch key exerts pressure to the target operation surface 21a. Thereby, the coupling arm 21 is rotated.

The switches SW1-SW4 are arranged at a lower part of the switch mechanism 10. Specifically, the switch SW1 is provided in a position facing an operation protrusion 11b of the switch key 11. The switch SW2 is provided in a position facing an operation protrusion 13b of the switch key 13. The switch SW3 is provided in a position facing an operation protrusion 14b of the switch key 14. The switch SW4 is provided in a position facing an operation protrusion 16b of the switch key 16.

Each of the switches SW1-SW4 is in an OFF state when not operated. On the other hand, in a case where any of the switch keys 11, 13, 14, and 16 is operated, the switch SW1-SW4 provided in correspondence with the operated switch key becomes an ON state.

In this embodiment, micro-switches are used as the switches SW1-SW4. However, the switches SW1-SW4 are not limited to mechanical switches such as the micro-switches. For example, various types of detectors such as an electrostatic capacitance type, an optical type, or a resistance type may be used. Further, as described below, the switches SW1-SW4 may be formed on a substrate.

Next, the arrangement positions of the operation protrusions 20b, 21b formed in the coupling arms 20, 21 are described. In a state where the switch mechanism 10 and the power generation apparatus 30 are combined, the operation protrusion 20b engages a first operation part 32A and the operation protrusion 21b engages a second operation part 32B.

Therefore, the operation protrusion 20b exerts pressure to the first operation part 32A of the power generation apparatus 30 by rotating the coupling arm 20 about the support shaft (shaft part 20c). Further, the operation protrusion 21b exerts pressure to the second operation part 323 of the power generation apparatus 30 by rotating the coupling arm 21 about the support shaft (shaft part 21c).

As described above, the flange parts 11a-13a of the switch keys 11-13 engage the target operation surface 20a of the coupling arm 20. Thereby, regardless of which switch key of the switch keys 11-13 is operated, the coupling arm 20 rotates and exerts pressure to the first operation part 32A. Therefore, regardless of which of the switch keys 11-13 is operated, the power generation apparatus 30 performs power generation.

Similarly, the flange parts 14a-16a of the switch keys 14-16 engage the target operation surface 21a of the coupling arm 21. Thereby, regardless of which switch key of the switch keys 14-16 is operated, the coupling arm 21 rotates and exerts pressure to the second operation part 323. Therefore, regardless of which of the switch keys 14-16 is operated, the power generation apparatus 30 performs power generation. Further, in this case, the built-in switch SW5 provided in the housing 31 changes into an ON state when the second operation part 32B is operated.

Next, the movement of the power generation switch apparatus 1A is described with reference to FIG. 5 to FIG. 8. In the following description, the power generation switch apparatus 1A is assumed to be mounted on a vehicle.

Figure 4:
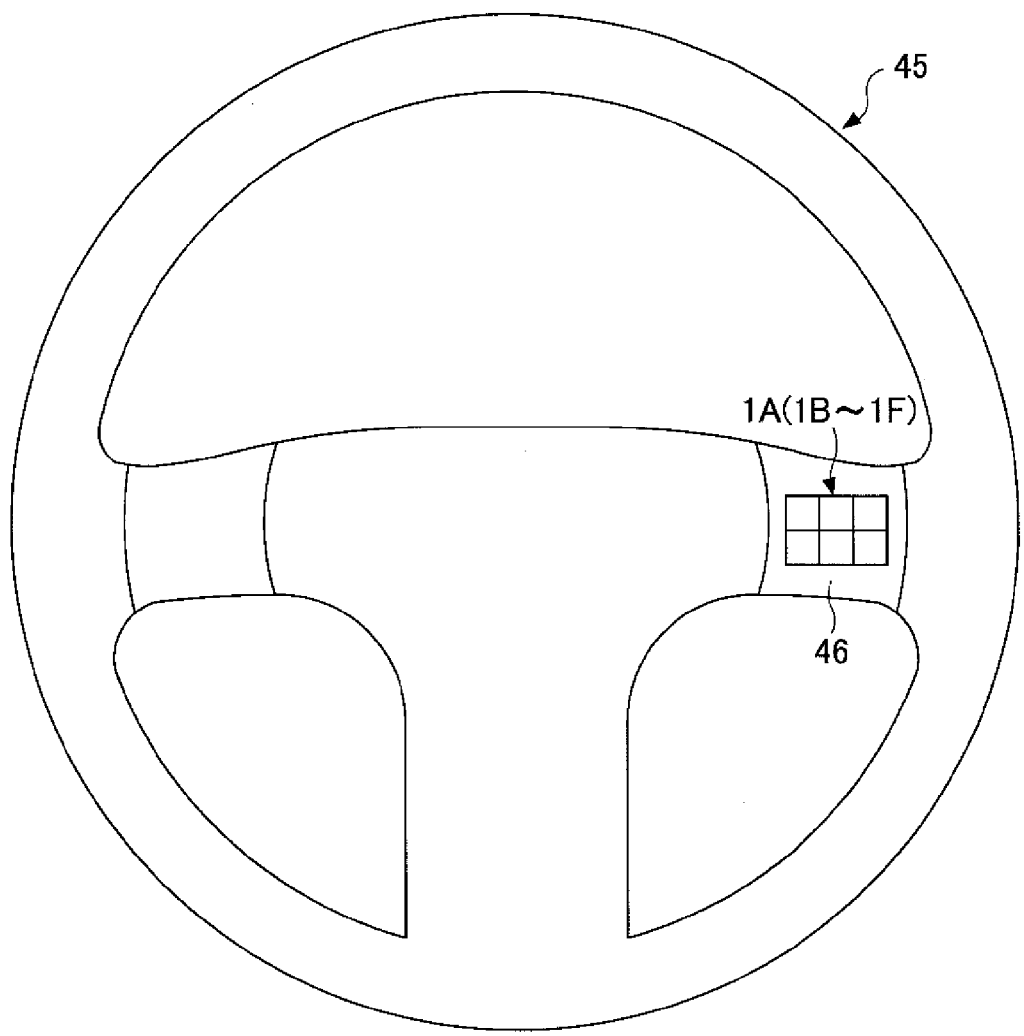
FIG. 4 is a diagram illustrating an example in which the power generation switch apparatus of the first embodiment is used as a steering switch.

More specifically, as illustrated in FIG. 4, the power generation switch apparatus 1A is used as a steering switch of a steering wheel 45. That is, an example where the power switch apparatus 1A transmits a switch signal to an audio device of a vehicle (electronic device) is described. It is, however, to be noted that the power generation switch apparatus 1A of this embodiment is not limited to a power generation switch of a vehicle.

FIG. 8 illustrates a relationship of each of the switch keys 11-16 and functions of an audio device. As illustrated in FIG. 8, the switch key 11 corresponds to a function of changing a channel of the audio device to a negative direction. The switch key 12 corresponds to a function of changing a sound volume to a negative direction. The switch key 13 corresponds to a function of switching a mode to a reverse direction. The switch key 14 corresponds to a function of changing a channel to a positive direction. The switch 15 corresponds to a function of changing a sound volume to a positive direction. The switch 16 corresponds to a function of switching a mode to a forward direction.

Further, a correspondence between the on/off states of the switches SW1-SW5 and each of the functions of the audio apparatus is illustrated in FIG. 8. In FIG. 8, electromotive force being "ON" indicates that the power generation apparatus 30 (power generator 33) is performing power generation. A corresponding relationship between each of the switches and the functions illustrated in FIG. 8 is stored beforehand as data in the switch control circuit 41 illustrated in FIG. 3.

Figure 5:
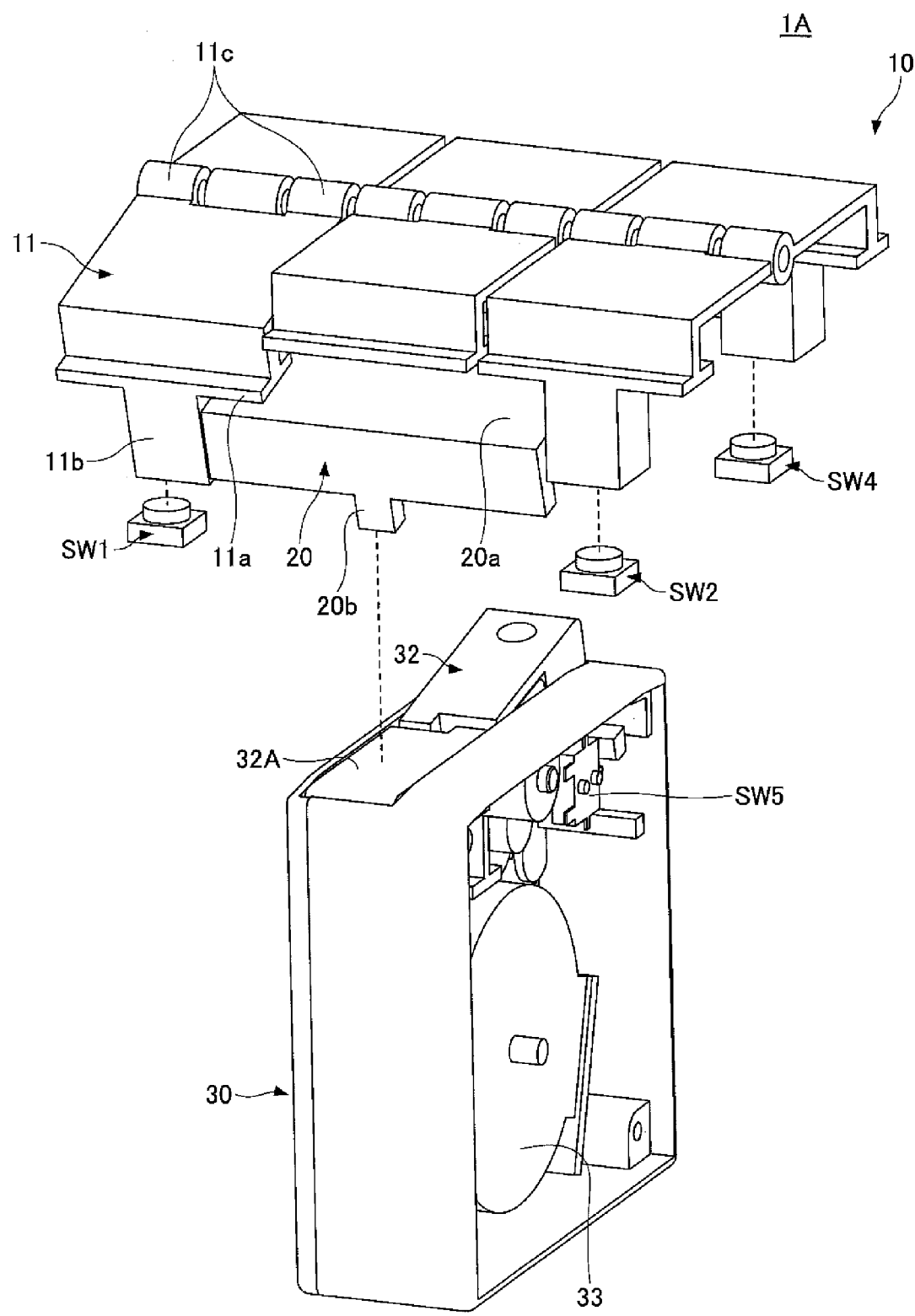
FIG. 5 is a diagram for describing movement of the power generation switch apparatus of the first embodiment (part 1)

First, a case of the switch key 11 being operated by a driver is described. FIG. 5 illustrates a state where the switch key 11 of the power generation switch apparatus 1A is operated.

By operating the switch key 11, the switch key 11 rotates about the shaft part 11c as illustrated in FIG. 5. The operation protrusion 11b that is integrally formed with the switch key 11 moves along with the rotation of the switch key 11 and exerts pressure to the switch SW1. Thereby, the switch SW1 is switched from an OFF state to an ON state. In FIG. 5, the operation protrusion 11b and the switch SW1 are illustrated apart from each other for clearly showing a positional relationship between the operation protrusion 11b and the switch SW1. However, actually, the operation protrusion 11b performs an ON operation on the switch SW1 as described above (the same applies to FIGS. 6 and 7 used for explaining the movements of the below-described switch keys 12, 13).

By the above-described rotation of the switch key 11, the flange part 11a of the switch key 11 exerts pressure to the target operation surface 20a of the coupling arm 20 in a downward direction of the drawing. Thereby, the coupling arm 20 rotates about the shaft part 20c, and the operation protrusion 20b being integrally formed with the coupling arm 20 exerts pressure to the first operation part 32A of the power generation apparatus 30. Thus, by operating the first operation part 32A, the power generation apparatus 30 (power generator 33) performs power generation.

In this embodiment, the timing for performing an ON operation on the switch SW1 is adjusted to be performed before the timing of performing the power generation. The timing adjustment may be performed by, for example, adjusting the lengths of the operation protrusions 11b, 20b. By performing the timing adjustment, the ON/OFF of the switch SW1 can be detected accurately compared to a configuration of switching the SW1 immediately after the start of the power generation.

The switches SW1-SW5 are connected to the switch control circuit 41 as described above. Further, the switch control circuit 41 and the transmission circuit 42 are driven by the electric power generated by the power generation apparatus 30. Accordingly, the switch control circuit 41 can detect the power generation of the power generation apparatus 30 by being supplied with the electric power (see FIG. 3).

Accordingly, in the example illustrated in FIG. 5, the switch control circuit 41 determines that the switch key 11 is being operated according to the power generation performed by the power generation apparatus 30 in a state where only the switch SW1 is ON. When the switch key 11 is determined as being operated, the switch control circuit 41 transmits a switch signal (hereinafter referred to as "CH change (−) signal") corresponding to a function of changing a channel to a negative direction to the transmission circuit 42.

When the CH change (−) signal is transmitted, the transmission circuit 42 wirelessly transmits the CH change (−) signal to the audio device via the antenna 43. Then, the audio device, upon receiving the CH change (−) signal, executes a process of changing a channel to a negative direction.

Figure 6:
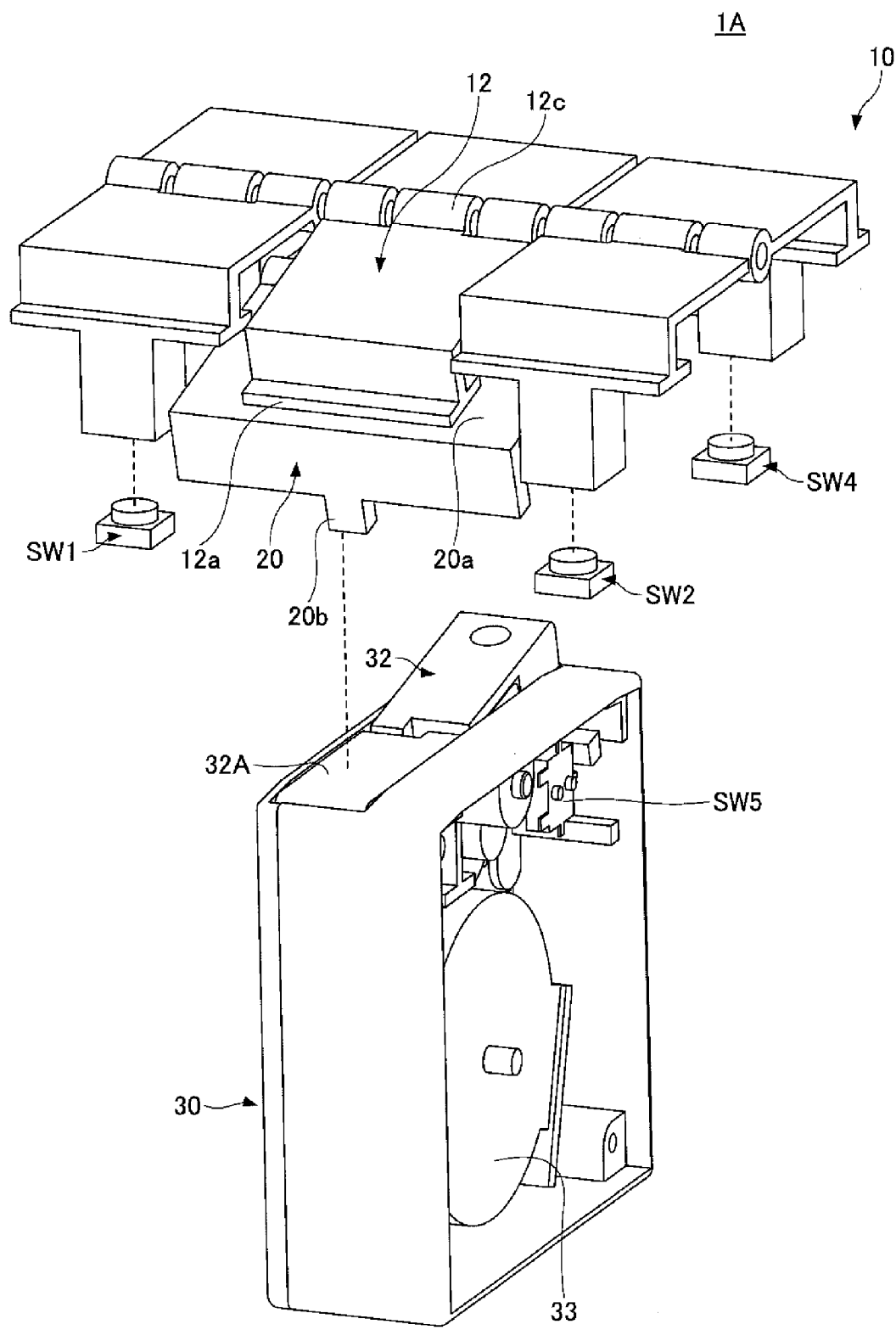
FIG. 6 is a diagram for describing movement of the power generation switch apparatus of the first embodiment (part 2)

Next, a case of the switch key 12 being operated by a driver is described. FIG. 6 illustrates a state where the switch key 12 of the power generation switch apparatus 1A is operated.

By operating the switch key 12, the switch key 12 rotates about the shaft part 12c as illustrated in FIG. 6. Accordingly, the flange part 12a of the switch key 12 exerts pressure to the target operation surface 20a of the coupling arm 20 in a downward direction of the drawing. Thereby, the coupling arm 20 rotates about the shaft part 20c, and the operation protrusion 20b being integrally formed with the coupling arm 20 exerts pressure to the first operation part 32A of the power generation apparatus 30. Thereby, the power generation apparatus 30 performs power generation.

In the example of operating the switch key 12 illustrated in FIG. 6, the switches SW1-SW5 are all in an OFF state, and only the power generation apparatus 30 (power generator 33) is performing power generation. Thus, the switch control circuit 41 determines that the present state of the switch key 12 is an operated state according to the corresponding relationship stored beforehand as illustrated in FIG. 8.

Accordingly, when the switch key 12 is determined as being operated, the switch control circuit 41 transmits a switch signal (hereinafter referred to as "sound volume change (−) signal") corresponding to a function of changing a sound volume to a negative direction to the transmission circuit 42.

The transmission circuit 42, upon receiving the sound volume change (−) signal, wirelessly transmits the sound volume change (−) signal to the audio device via the antenna 43. Then, the audio device, upon receiving the sound volume change (−) signal, executes a process of changing the sound volume to a negative direction.

Accordingly, in this embodiment, the power generator 33 is used as a switch unit together with the switches SW1-SW5. Therefore, the number of switches constituting a switch unit and the cost of the power generation switch apparatus 1A can be reduced compared to a configuration where a switch SW (microswitch) is provided in correspondence with the switch key 12.

Figure 7:
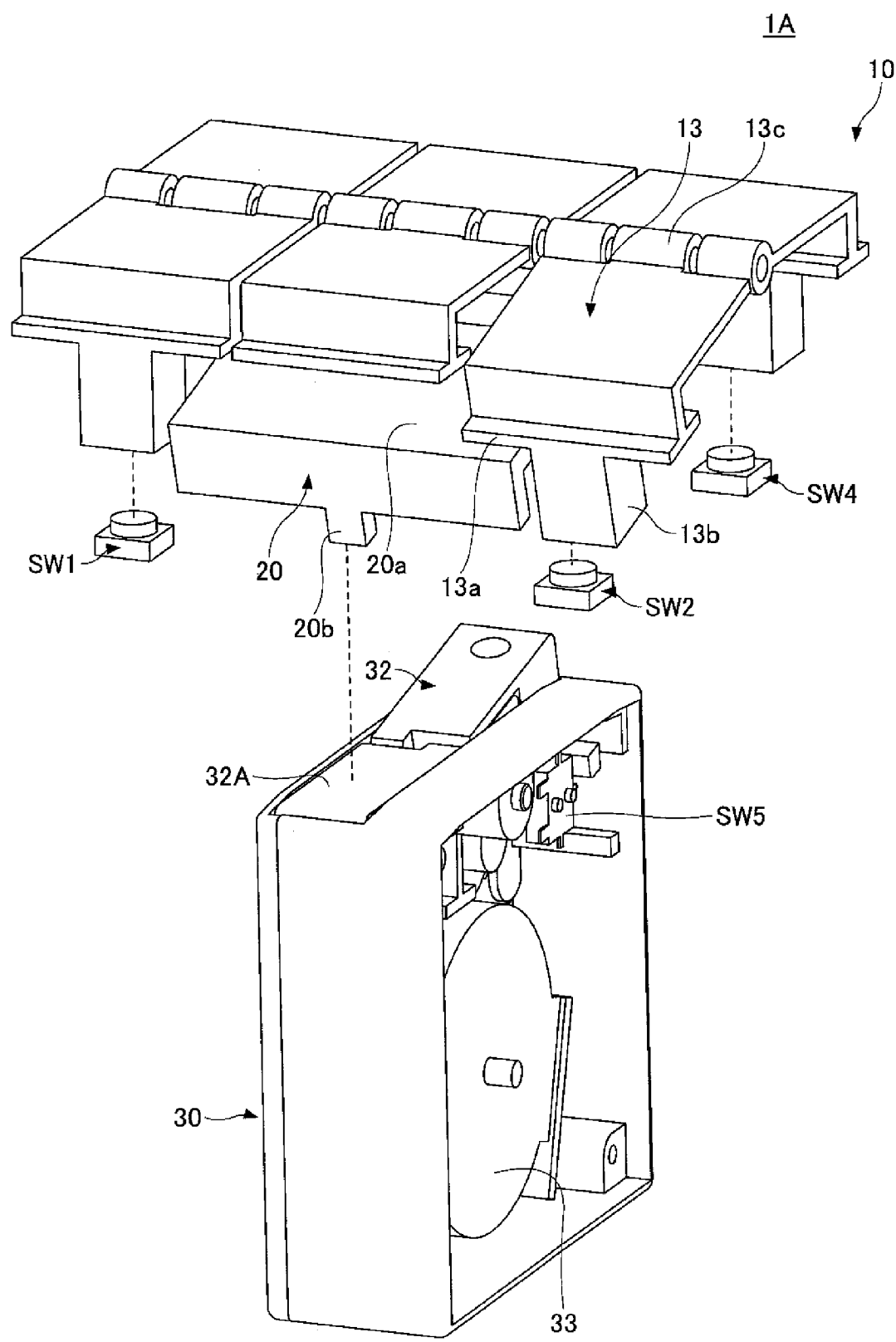
FIG. 7 is a diagram for describing movement of the power generation switch apparatus of the first embodiment (part 3)
Figure 9:
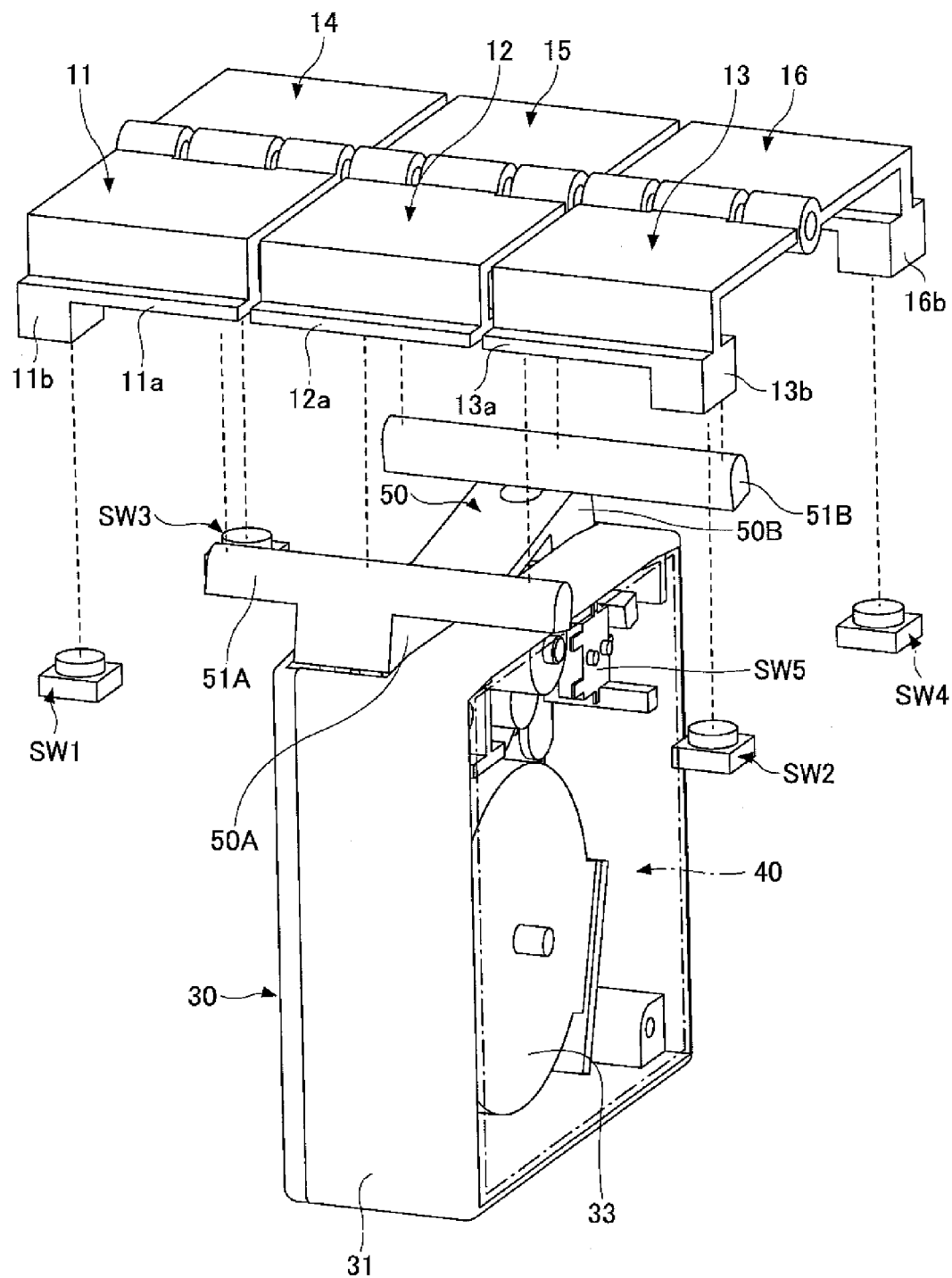
FIG. 9 is a perspective view illustrating a state where a switch mechanism of a power generation switch apparatus of a second embodiment is separated from a power generation apparatus.

Next, a case of the switch key 13 being operated by a driver is described. FIG. 7 illustrates a state where the switch key 13 of the power generation switch apparatus 1A is operated.

By operating the switch key 13, the switch key 13 rotates about the shaft part 13c. The operation protrusion 13b that is integrally formed with the switch key 13 moves along with the rotation of the switch key 13 and exerts pressure to the switch SW2. Thereby, the switch SW2 is switched from an OFF state to an ON state.

By the rotation of the switch key 13, the flange part 13a of the switch key 13 exerts pressure to the target operation surface 20a of the coupling arm 20 in a downward direction of the drawing. Thereby, the coupling arm 20 rotates about the shaft part 20c, and the operation protrusion 20b being integrally formed with the coupling arm 20 exerts pressure to the first operation part 32A of the power generation apparatus 30. Thus, by operating the first operation part 32A, the power generation apparatus 30 (power generator 33) performs power generation.

In this state also, the timing for performing an ON operation on the switch SW2 is adjusted to be performed before the timing of performing the power generation. Therefore, the ON/OFF of the switch SW2 can be detected accurately.

In the example where the switch key 13 illustrated in FIG. 7 is operated, the power generation apparatus 30 (power generator 33) performs power generation in a state where only the switch SW2 is in an ON state. Therefore, the switch control circuit 41 determines that the present state of the switch key 13 is an operated state according to the corresponding relationship stored beforehand as illustrated in FIG. 8.

Accordingly, when the switch key 13 is determined as being operated, the switch control circuit 41 transmits a switch signal (hereinafter referred to as "mode switch (reverse direction) signal") corresponding to a function of switching a mode to a reverse direction to the transmission circuit 42.

When the mode switch (reverse direction) signal is transmitted, the transmission circuit 42 wirelessly transmits the mode switch (reverse direction) signal to the audio device via the antenna 43. Then, the audio device, upon receiving the mode switch (reverse direction) signal, executes a process of switching a mode to a reverse direction.

Next, movements in a case of operating the switch keys 14-16 are described. The switch keys 14-16 and the coupling arm 21 are symmetrically arranged with the switch keys 11-13 and the coupling arm 20 via the support shafts. Therefore, the movement of the power generation switch apparatus 1A in a case of operating the switch keys 14-16 is symmetrical to the movement of the power generation switch apparatus 1A in a case of operating the switch keys 11-13. Therefore, the movement in a case of operating the switch keys 11-13 is not illustrated.

When the switch SW3 is operated by a driver, the operation protrusion 14*b* of the switch key 14 exerts pressure to the switch SW3, and the switch SW3 is switched from an OFF state to an ON state. Further, the flange part 14*a* exerts pressure to the target operation surface 21*a* of the coupling arm 21, and the operation protrusion 21*b* of the coupling arm 21 exerts pressure to the second operation part 32B of the power generation apparatus 30. Therefore, first, the switch SW5 installed in the power generator 33 is switched from an OFF state to an ON state, and then, the power generation apparatus 30 (power generator 33) performs power generation.

Because power generation is being performed by the power generation apparatus 30 in a state where the switches SW3, SW5 are ON, the switch control circuit 41 determines that the switch key 14 is being operated based on the corresponding relationship illustrated in FIG. 8. The switch control circuit 41 transmits a switch signal (hereinafter referred to as "CH change (+) signal") corresponding to a function of changing a channel to a positive direction to the transmission circuit 42.

When the CH change (+) signal is transmitted, the transmission circuit 42 wirelessly transmits the CH change (+) signal to the audio device via the antenna 43. Then, the audio device, upon receiving the CH change (+) signal, executes a process of changing a channel to a positive direction.

Further, when the switch key 15 is operated by a driver, the flange part 12*a* of the switch key 15 exerts pressure to the target operation surface 20*a* of the coupling arm 20. Accordingly, because the operation protrusion 20*b* exerts pressure to and operates on the second operation part 32B of the power generation apparatus 30, the power generation apparatus 30 performs power generation.

However, in a case where the switch key 15 is operated, the built-in switch SW5 is in an ON state whereas the switches SW1-SW4 are in an OFF state because the second operation part 32B is operated as described above. Accordingly, because power generation is being performed by the power generation apparatus 30 in a state where the built-in switch SW5 is ON, the switch control circuit 41 determines that the switch key 15 is being operated based on the corresponding relationship illustrated in FIG. 8.

Based on the determination results, the switch control circuit 41 transmits a switch signal (hereinafter referred to as "sound volume change (+) signal") corresponding to a function of changing a sound volume to a positive direction to the transmission circuit 42. When the sound volume change (+) signal is transmitted, the transmission circuit 42 wirelessly transmits the sound volume change (+) signal to the audio device via the antenna 43. Then, the audio device, upon receiving the sound volume change (+) signal, executes a process of changing a sound volume to a positive direction.

Further, when the switch key 16 is operated by a driver, the operation protrusion 16*b* of the switch key 16 exerts pressure to the switch SW4, and the switch SW4 is switched from an OFF state to an ON state. Accordingly, the flange part 16*a* exerts pressure to the target operation surface 21*a* of the coupling arm 21, and the operation protrusion 21*b* of the coupling arm 21 exerts pressure to the second operation part 32B of the power generation apparatus 30. Therefore, first, the switch SW5 installed in the power generator 33 is switched from an OFF state to an ON state, and then, the power generation apparatus 30 (power generator 33) performs power generation.

Because power generation is being performed by the power generation apparatus 30 in a state where the switches SW4, SW5 are ON, the switch control circuit 41 determines that the switch key 16 is being operated based on the corresponding relationship illustrated in FIG. 8. The switch control circuit 41 transmits a switch signal (hereinafter referred to as "mode switch (forward direction) signal") corresponding to a function of switching a mode to a forward direction to the transmission circuit 42.

The transmission circuit 42, upon receiving the mode switch (forward direction) signal, wirelessly transmits the mode switch (forward direction) signal to the audio device via the antenna 43. Then, the audio device, upon receiving the mode switch (forward direction) signal, executes a process of switching a mode to a forward direction.

Accordingly, with the power generation switch apparatus 1A of this embodiment, a single power generation apparatus 30 can be responsive to operations of six switch keys 11-16 and transmits six types of switch signals to the audio device (electronic device). Therefore, the power generation switch apparatus 1A can have a simplified and size-reduced configuration without having to provide a power generation apparatus for each of the switch keys 11-16. Further, because six switch keys 11-16 can be identified with five switches SW1-SW5, the number of switches and cost can be reduced.

Next, second to sixth embodiments of the present invention are described with reference to FIGS. 9 to 21.

In FIGS. 9 to 21, like components are denoted with like reference numerals as those of FIGS. 1 to 8 and are not further explained.

The power generation switch apparatus 1B of the first embodiment transmits the operation force exerted upon the switch keys 11-16 to the switches SW1-SW4 and the operation lever 32 (first and second operation parts 32A, 32B) by using the switch mechanism 10 including the coupling arms 20, 21.

However, a power generation switch apparatus 1B of this embodiment has a first extending part 51A integrally formed with a first operation part 50A of an operation lever 50 provided in the power generation apparatus 30, and a second extending part 51B integrally formed with a second operation part 50B.

The first extending part 51A extends in a direction in which the switch keys 11-13 are arranged and faces the flange parts 11*a*-13*a* of each of the switch keys 11-13. Therefore, regardless of which switch key 11-13 is operated, pressure is exerted on the first extending part 51A. Accordingly, regardless of which switch key 11-13 is operated, pressure is exerted on the first operation part 50A via the first extending part 51A, and power generation is performed by the power generation apparatus 30 (power generator 33).

Similarly, the second extending part 51B extends in a direction in which the switch keys 14-16 are arranged and faces the flange parts 14a-16a of each of the switch keys 14-16. Therefore, regardless of which switch key 14-16 is operated, pressure is exerted to the second extending part 51B. Accordingly, regardless of which switch key 11-13 is operated, pressure is exerted to the second operation part 50B via the second extending part 51B, and power generation is performed by the power generation apparatus 30 (power generator 33).

Accordingly, unlike the power generation switch apparatus 1A of the first embodiment, the power generation switch apparatus 1B of this embodiment can perform power generation with the power generation apparatus 30 without using the coupling arms 20, 21. That is, a link mechanism for transmitting operations of each of the switch keys 14-16 is not required. Accordingly, with the power generation switch apparatus 1B of this embodiment, the number of components and size can be reduced compared to those of the power generation switch apparatus 1A of the first embodiment.

Figure 10:
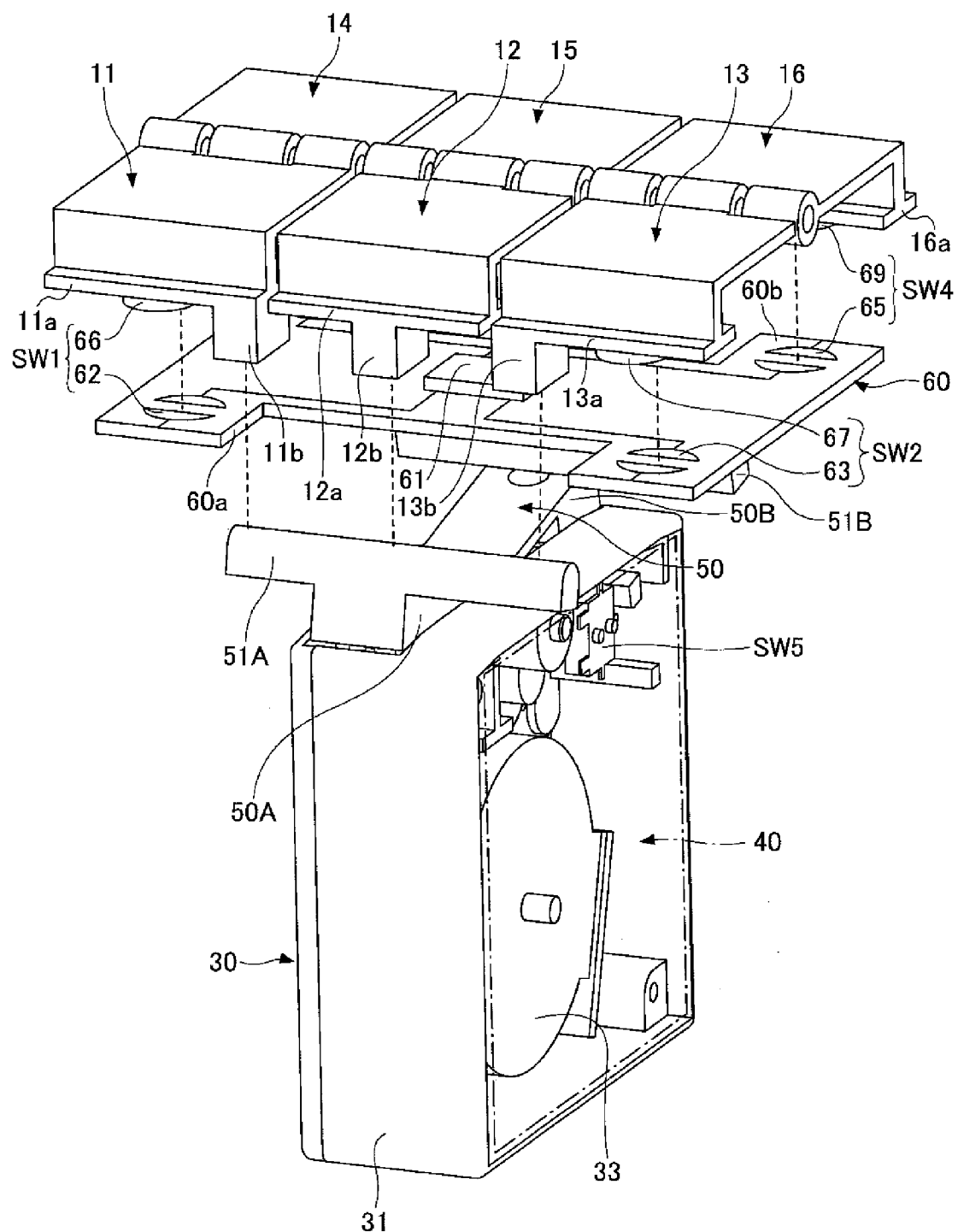
FIG. 10 is a perspective view illustrating a state where a switch mechanism of a power generation switch apparatus of a third embodiment is separated from a power generation apparatus.

FIG. 10 illustrates a power generation switch apparatus 1C of the third embodiment.

With the power generation switch apparatus 1A of the first embodiment, separate individual switches SW1-SW5 are used as switch units. However, the power generation switch apparatus 1C of this embodiment uses a switch substrate 60 having the switches SW1-SW4 integrally provided thereto.

The switch substrate 60 is provided between the switch keys 11-16 and the power generation apparatus 30. Switch patterns 62-65 (switch pattern 64 not illustrated) are formed in areas of the switch substrate 60 facing the respective switch keys 11, 13, 14, 16. Switch electrodes 66-69 (switch electrode 68 not illustrated) are formed in areas of the switch keys 11, 13, 14, 16 facing the respective switch patterns 62-65.

The switch pattern 62 and the switch electrode 66 constitute the switch SW1. The switch pattern 63 and the switch electrode 67 constitute the switch SW2. The switch pattern 64 and the switch electrode 68 constitute the switch SW3. The switch pattern 65 and the switch electrode 66 constitute the switch SW4.

In a state where the switch keys 11, 13, 14, and 16 are not operated, the switch patterns 62-65 and the switch electrodes 66-69 are separated from each other, and the switches SW1-SW4 are in an OFF state. On the other hand, when the switch keys 11, 13, 14, and 16 are operated, the switch electrodes 66-69 are connected to the switch patterns 62-65, and the switches SW1-SW4 corresponding to the operated switch keys 11, 13, 14, 16 become an ON state.

In this embodiment, a semiconductor chip 61 is provided on the switch substrate 60. The semiconductor chip 61 includes a microcomputer and provides the same function as the switch control circuit 41 illustrated in FIG. 3. It is to be noted that other circuits may also be provided on the switch substrate 60.

Both of the side edges of the switch substrate 60 are formed with recess parts 60a, 60b, respectively. Further, the operation protrusions 11b-16b (14b-16b not illustrated) are respectively formed in the flange parts 11a-16a of the switch keys 11-16 at positions facing the first and second extending parts 51A, 51B.

The control protrusions 11b-16b are arranged in positions facing the recess parts 60a, 60b. Accordingly, when the switch keys 11-16 are operated, the operation protrusions 11b-16b corresponding to the operation switch keys 11-16 directly exert pressure to the first extending part 51A or the second extending part 51B interposed by the recess parts 60a, 60b.

As described above, the power generation switch apparatus 10 of this embodiment has the switch patterns 62-65 of the switches SW1-SW4 integrally and entirely provided to the switch substrate 60. Therefore, the number of components of the power generation switch apparatus 10 can be reduced compared to the power generation apparatus 1A of the first embodiment having the switches SW1-SW4 arranged separately. Further, the assembling of the power generation switch apparatus 1C can be facilitated, and size-reduction can be achieved.

In the example illustrated in FIG. 10, the power generation apparatus 30 including the first and second extending parts 51A, 51B of the second embodiment is used as the power generation apparatus. Alternatively, the configuration provided with the switch mechanism 10 of the first embodiment may also be used.

Figure 11:
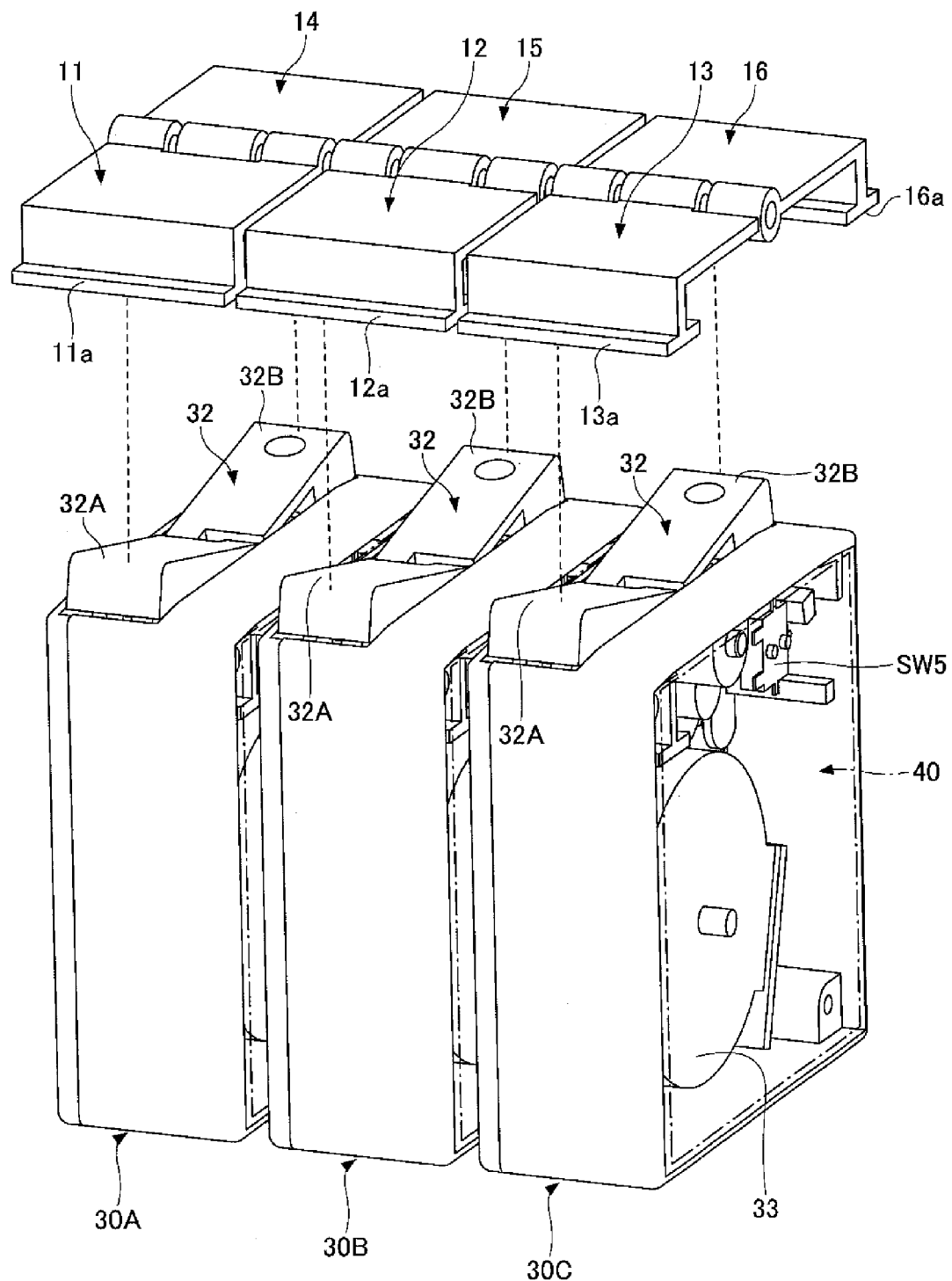
FIG. 11 is a perspective view illustrating a state where a switch mechanism of a power generation switch apparatus of a fourth embodiment is separated from a power generation apparatus.

FIG. 11 illustrates a power generation switch apparatus 1D according to the fourth embodiment of the present invention.

The power generation switch apparatus 1D of this embodiment is provided with three power generation apparatuses 30A-30C. The power generation apparatus 30A corresponds to the switch keys 11, 14, the power generation apparatus 30B corresponds to the switch keys 12, 15, and the power generation apparatus 300 corresponds to the switch keys 13, 16.

When the switch key 11 is operated, the first operation part 32A of the power generation apparatus 30A is operated by pressure exerted thereto. When the switch key 14 is operated, the second operation part 32B of the power generation apparatus 30A is operated by pressure exerted on it. When the switch key 15 is operated, the second operation part 32B of the power generation apparatus 303 is operated by pressure exerted on it. When the switch key 13 is operated, the first operation part 32A of the power generation apparatus 300 is operated by pressure exerted on it. When the switch key 16 is operated, the second operation part 32B of the power generation apparatus 30C is operated by pressure exerted on it.

As described above, the power generation switch apparatus 1D of this embodiment requires none of the switches SW1-SW4 or the switch substrate 60 required for the first-third embodiments. Further, the number of power generation apparatuses can be reduced compared to the configuration having the power generation apparatuses provided in correspondence with each of the switch keys 11-16.

FIGS. 12-17 illustrate a power generation switch apparatus 1E according to the fifth embodiment of the present invention.

Figure 12:
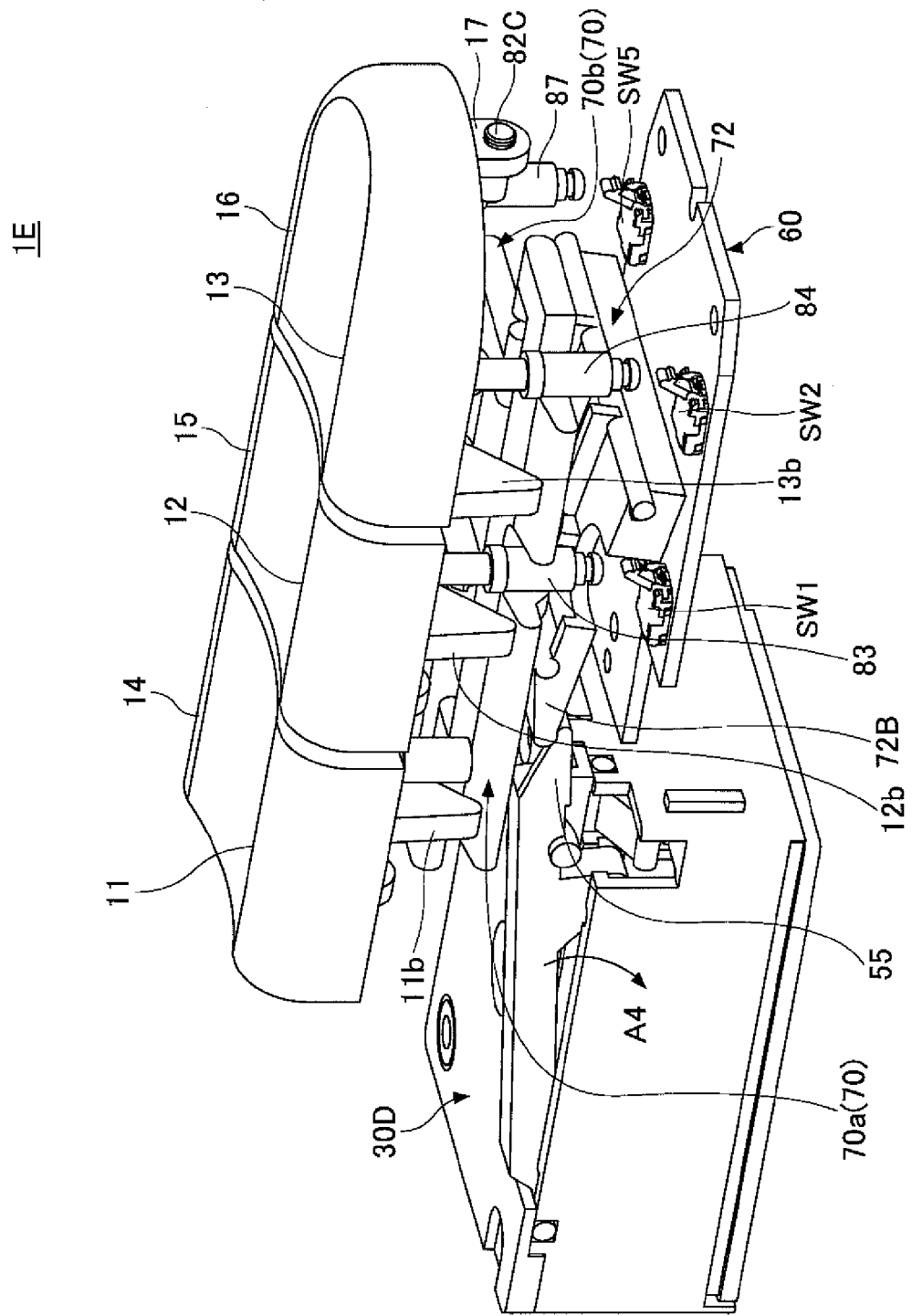
FIG. 12 is an enlarged perspective view of a part of a power generation switch apparatus of the fifth embodiment.
Figure 13:
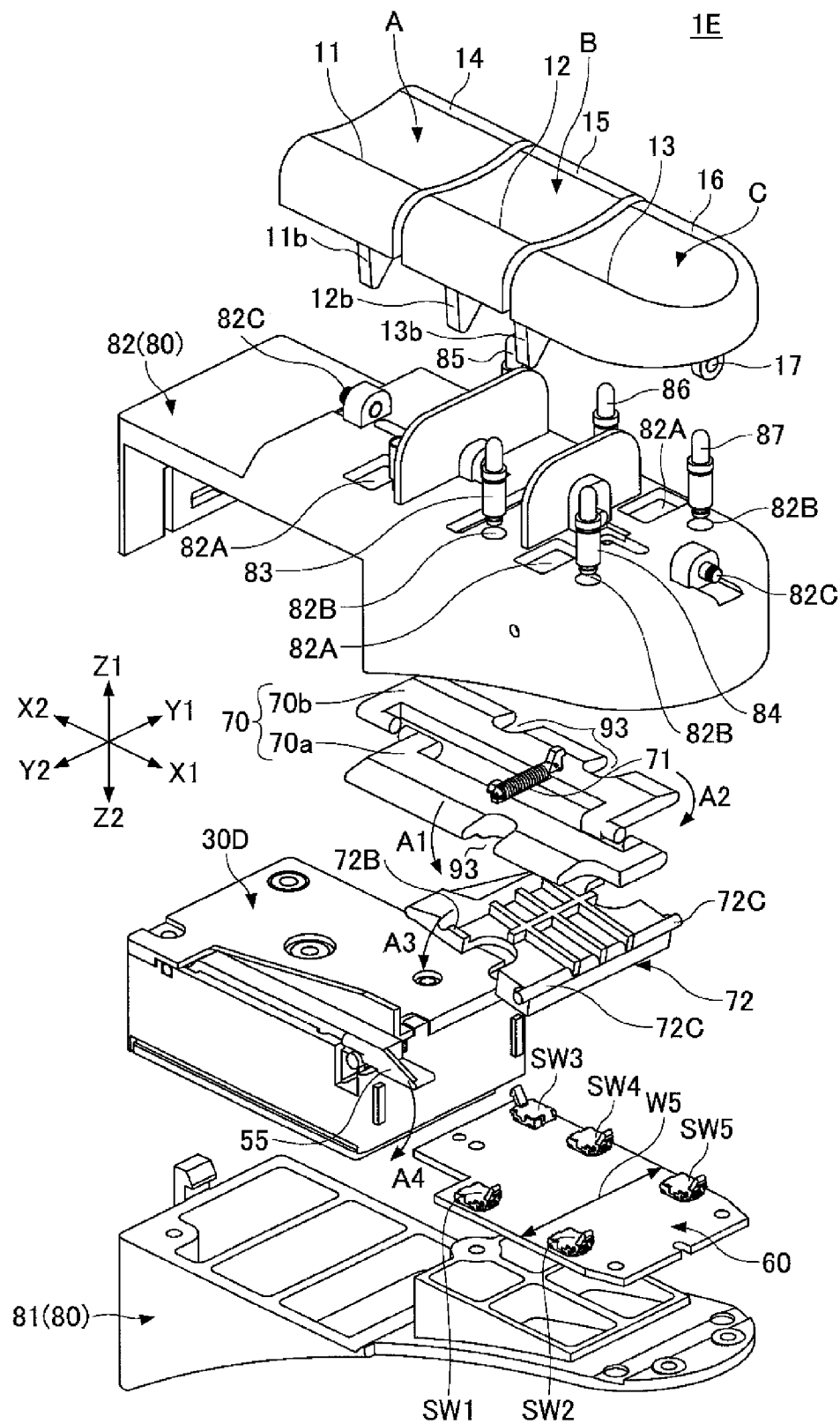
FIG. 13 is an exploded perspective view of the power generation switch apparatus of the fifth embodiment.
Figure 14:
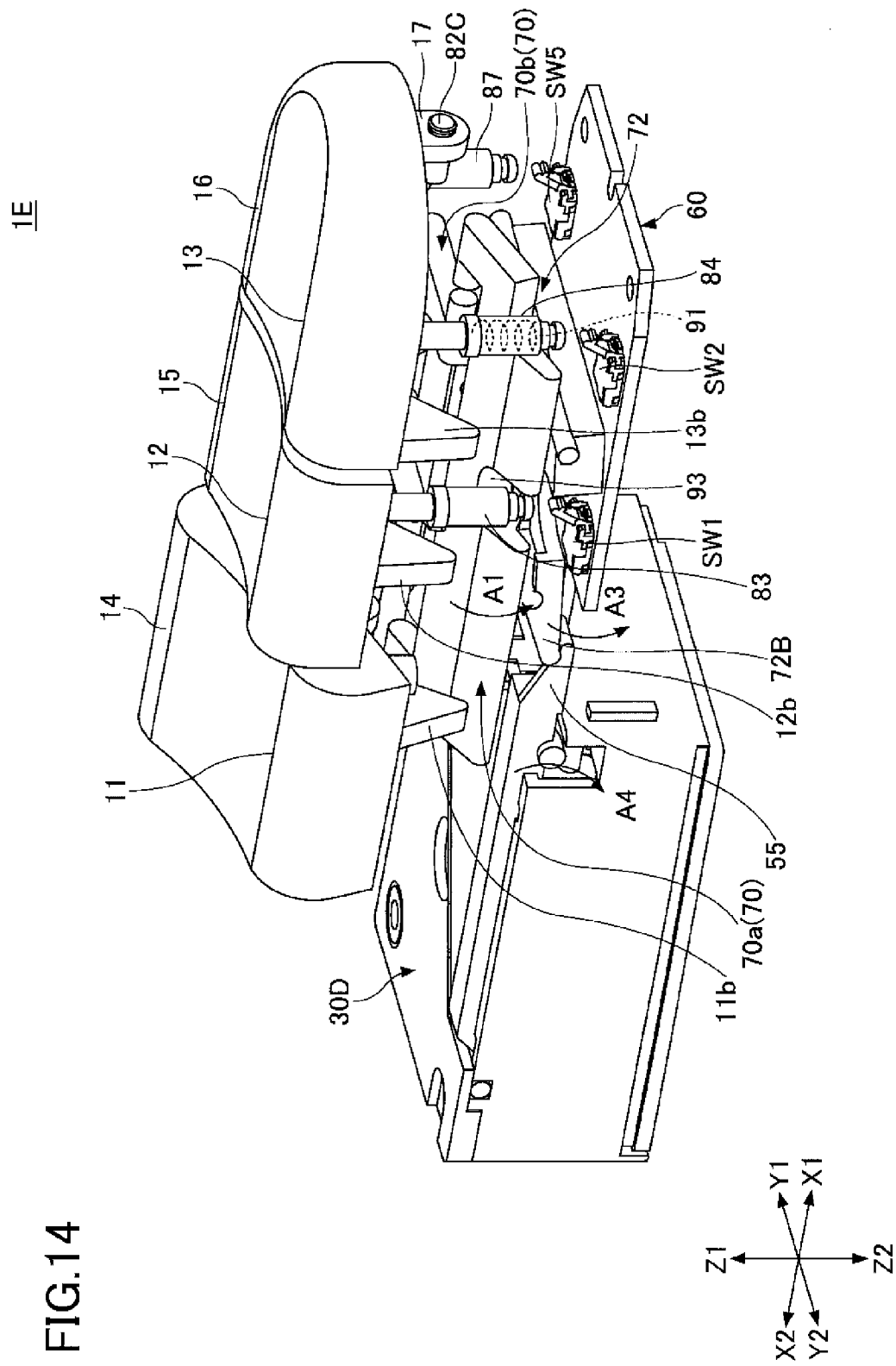
FIG. 14 is a diagram for describing movement of the power generation switch apparatus of the fifth embodiment (part 1)
Figure 15:
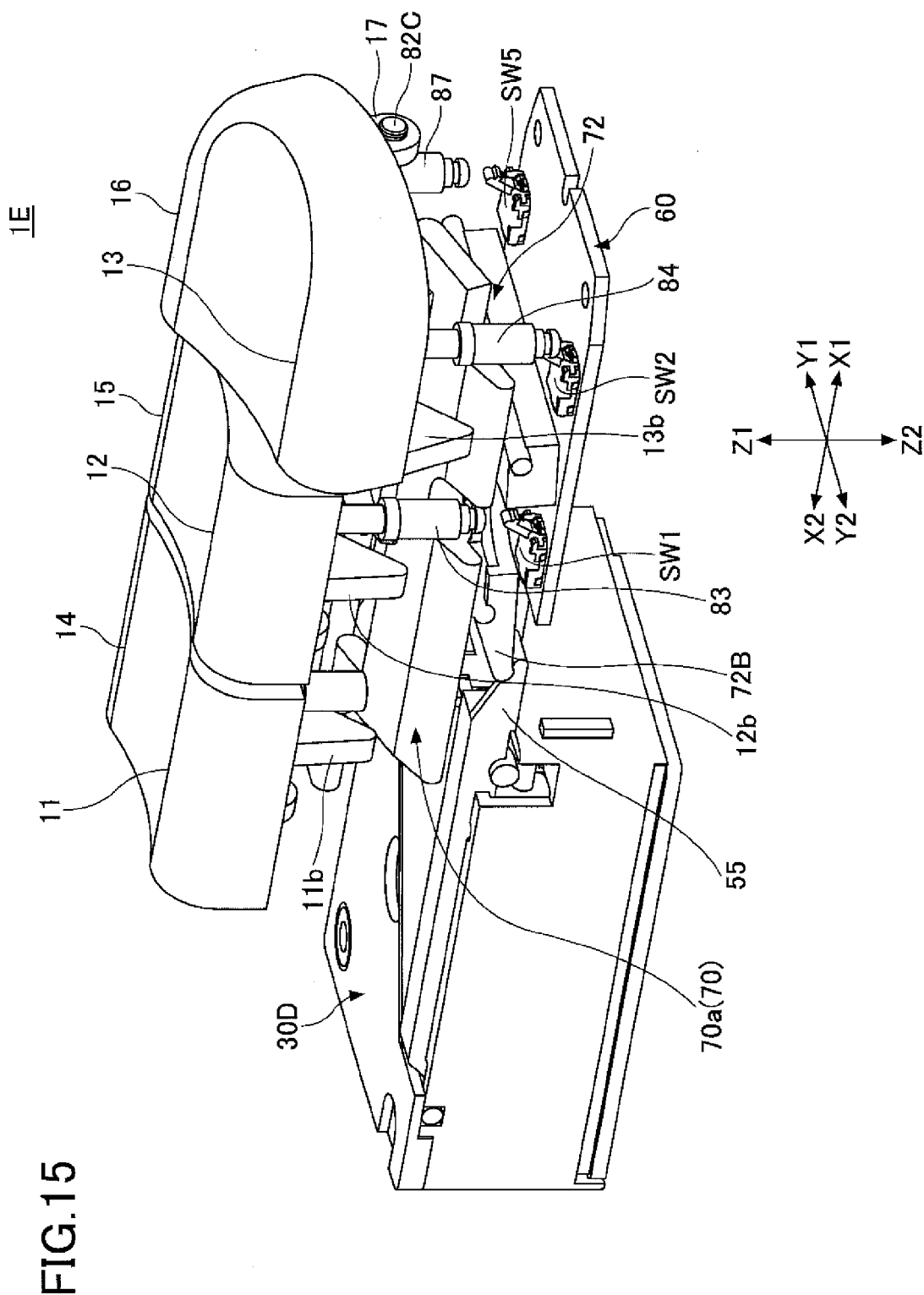
FIG. 15 is a diagram for describing movement of the power generation switch apparatus of the fifth embodiment (part 2)
Figure 16:
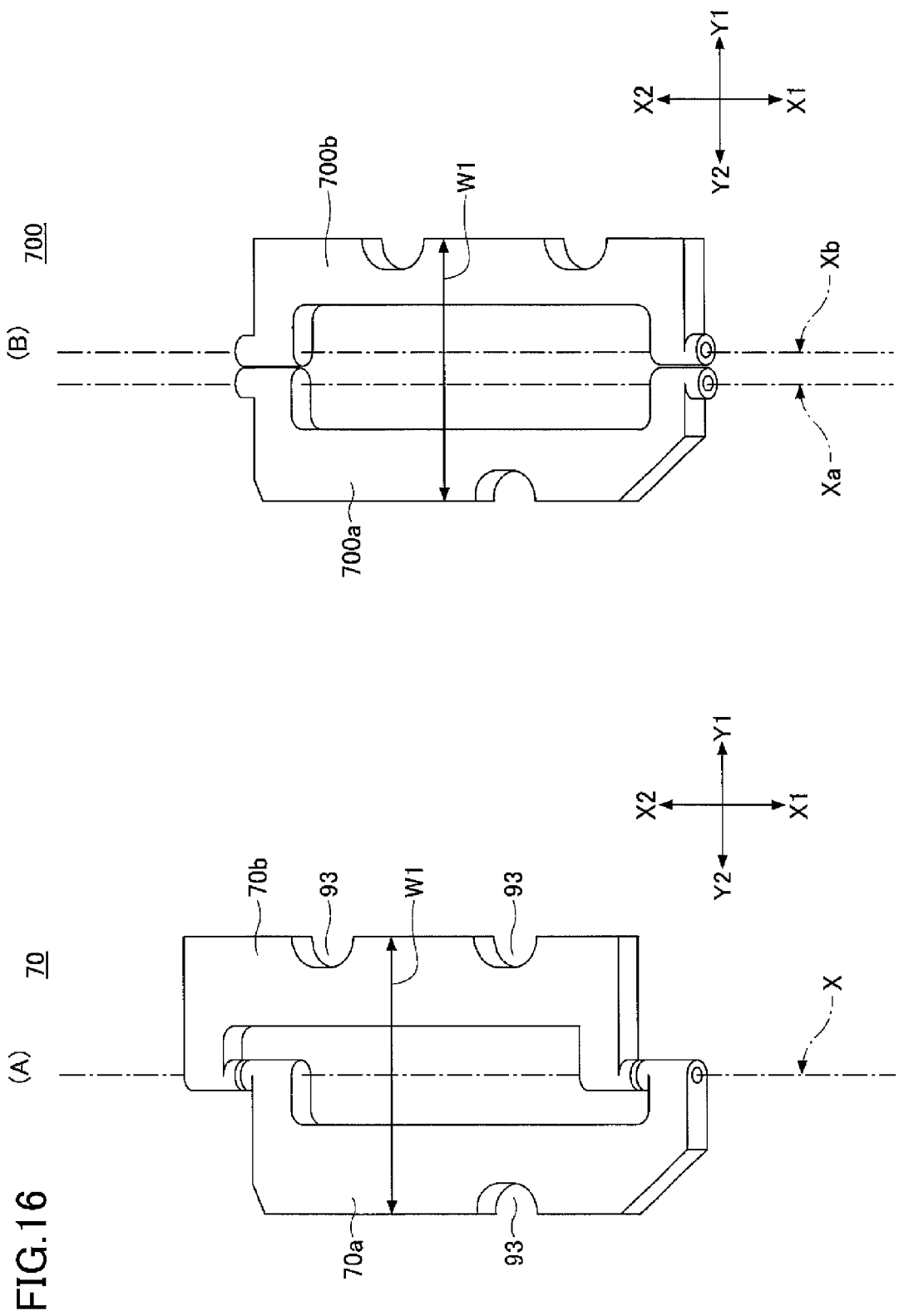
FIG. 16 (A) is an enlarged perspective view of a first link lever, and FIG. 16 (B) is a perspective view illustrating a first link lever of a comparative example.
Figure 17:
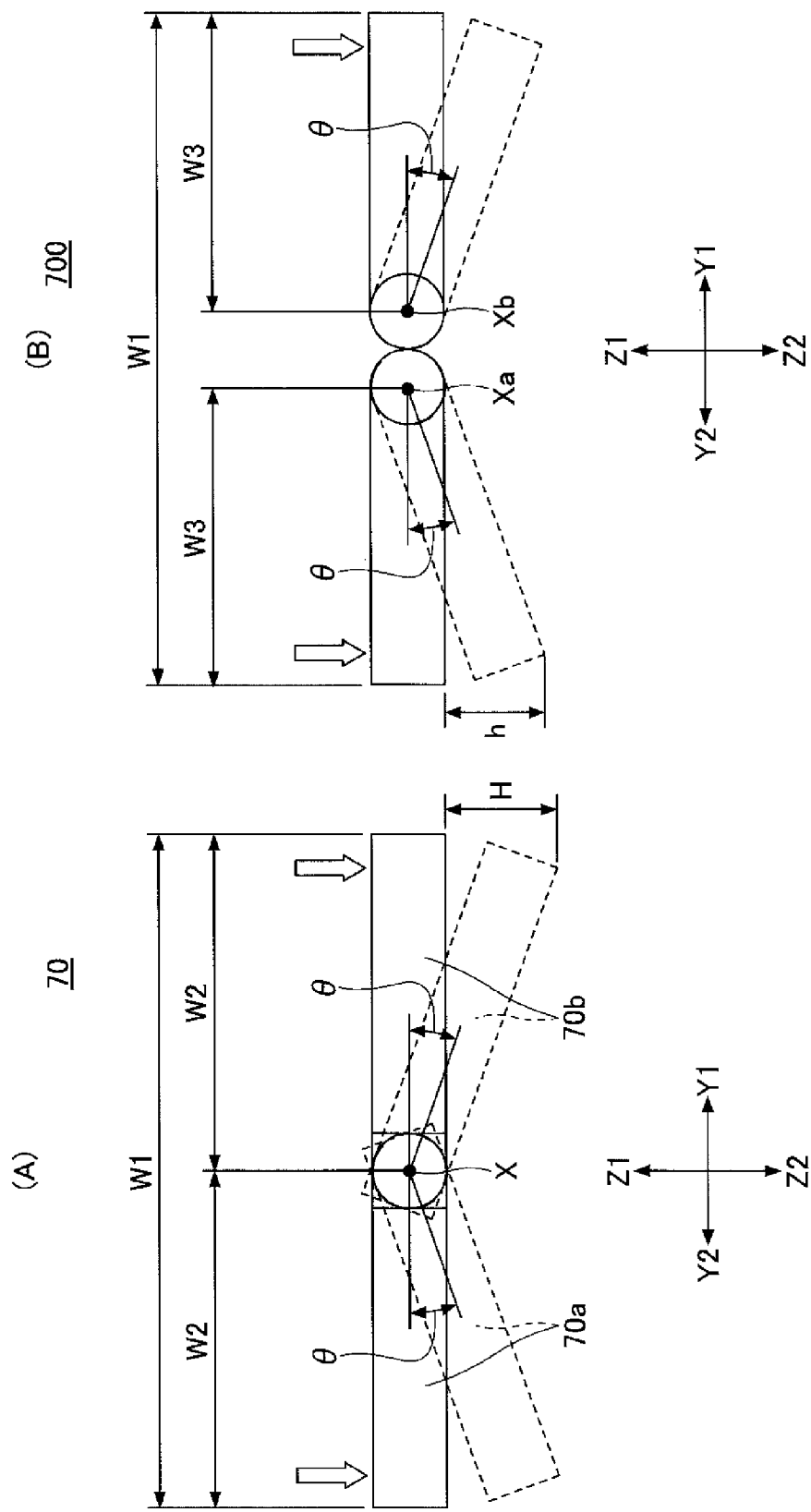
FIG. 17(A) is a diagram for describing movement of the first link lever.
FIG. 17(B) is a diagram for describing movement of the first link lever of the comparative example.

FIG. 12 is an enlarged perspective view of a part of the power generation switch apparatus 1E. FIG. 13 is an exploded perspective view of the power generation switch apparatus 1E. FIGS. 14 and 15 are diagrams illustrating examples of the movement of the power generation switch apparatus 1E. FIGS. 16 and 17 are diagrams illustrating a configuration and the movement of a first link lever 70. It is to be noted that the below-described switch case 80 is omitted from the drawings except for FIG. 13.

The power generation switch apparatus 1E of this embodiment includes, for example, the switch keys 11-16, a power generation apparatus 30D, the first link lever 70, a second link lever 72, the switch substrate 60, and the switch case 80. First, an entire configuration of the power generation switch apparatus 1E is described with reference to FIGS. 12 and 13.

In this embodiment, the switch key 11 and the switch key 14 (also collectively referred to as "switch key A") are integrally formed as a single component, the switch key 12 and the switch key 15 (also collectively referred to as "switch key B") are integrally formed as a single component, and the switch key 13 and the switch key 16 (also collectively referred to as "switch key C") are integrally formed as a single component.

A bearing 17 is formed in the three switch keys A-C. Further, a shaft part 82C is formed at an upper part of the switch case 80 (constituted by a base 81 and an upper cover 82). The switch keys A-C can be oscillatably attached to the switch case 80 by mounting the shaft part 82C in the bearing 17.

Operation protrusions 11b-16b extending downward are formed at a lower part of the respective switch keys 11-16 (operation protrusions 14b-16b not illustrated). Further, opening parts 82A corresponding to positions at which the operation protrusions 11b-16b are formed and mounting holes 82B into which the below-described coupling members 83-87 are mounted are formed on an upper surface of the upper cover 82 constituting the switch case 80.

Each of the operation protrusions 11b-16b of the switch keys 11-16 is provided in a position facing the respective opening part 82A. When pressure is exerted to the switch keys 11-16, the operation protrusion 14b-16b corresponding to the operated switch keys 11-16 projects downward from a lower surface of the upper cover 82 interposed by the opening part 82A.

The coupling members 83-87 are arranged at the lower parts of corresponding switch keys 12-16. The coupling members 83-87 are attached to the mounting holes 82B formed in the upper cover 82. The coupling members 83-87 include attachment parts and pins that vertically move relative to the attachment parts, respectively. The pin is biased in an upward direction by a spring 92 (illustrated with a broken line in the coupling member 84 of FIG. 14) provided in the attachment part.

Upper end parts of the pins of the coupling members 83-87 having the above-described configuration face rear surfaces of the switch keys 12-16 whereas lower end parts face the below-described switches SW1-SW5.

When pressure is exerted to the switch keys 12-16, the pressed switch keys 12-16 exert pressure on the pins of corresponding coupling members 83-87. Thereby, the pins are lowered, and corresponding switches SW1-SW5 are switched from an OFF state to an ON state.

Next, the first and second link levers 70, 72 are described. The first and second link levers 70, 72 are oscillatably provided inside the switch case 80. The first link lever 70 is constituted by a pair of half-link levers 70a, 70b. The half-link lever 70a can oscillate in a direction illustrated with an arrow A1 in FIG. 13. The half-link lever 70b can oscillate in a direction illustrated with an arrow A2 in FIG. 13. The second link lever 72 can oscillate in a direction illustrated with an arrow A3 in FIG. 13.

A link spring 71 spans between the half-link lever 70a and the half-link lever 70b. The link spring 71 provides a function of returning the half-link lever 70a or the half-link lever 70b back to its initial position when the half-link lever 70a is oscillated in the direction of the arrow A1 or when the half-link lever 70b is oscillated in the direction of the arrow A2.

As shown in the enlarged illustration of FIG. 16(A), the pair of the half-link levers 70a, 70b oscillates about a concentric rotation axis X. That is, the half-link lever 70a and the half-link lever 70b are arranged deviated from each other in a vertical direction in FIG. 16(A) (arrow directions X1 and X2). Thereby, the pair of half link levers 70a, 70b can oscillate about the concentric rotation axis X.

On the other hand, a first link lever 700 of a comparative example has a half-link lever 700a and a half-link lever 700b arranged in arrow directions Y1 and Y2. In the first link lever 700 of the comparative example, a rotation center Xa of the half-link lever 700a and a rotation axis Xb of the half-link lever 700b are deviated from each other in the arrow directions Y1 and Y2.

With the first link lever 70 of this embodiment, the widths of the half-link levers 70a, 70b (lengths in the arrow directions Y1 and Y2 in the drawings) can be increased compared to those of the first link lever 700 of the comparative example. This is described with reference to FIG. 17.

FIG. 17(A) is a diagram viewed from a direction of the rotation axis of the first link lever 70, and FIG. 17(B) is a diagram viewed from a direction of the rotation axis of the first link lever 700 of the comparative example. As described above, the power generation switch apparatus 1E is a switch provided to the steering wheel 45 or the like (see FIG. 4) and is required to have a small size. Therefore, the permissible width (length in the arrow directions Y1 and Y2) of the first link lever 70 is to be restricted. Accordingly, the width of the first link lever 70 and the width of the first link lever 700 are described assuming that they are both "W1".

With the first link lever 70 of this embodiment, the length from the rotation axis X to a side edge part of each half-link lever 70a, 70b is assumed to be "W2". On the other hand, with the first link lever 700 of the comparative example, the length from the rotation axes Xa, Xb to a side edge part of each half-link lever 700a, 700b is assumed to be "W3".

As described above, the half-link levers 70a, 70b of this embodiment rotate about the same rotation axis X whereas the half-link levers 700a, 700b of the comparative example rotate about different rotation axes Xa, Xb, respectively. Therefore, compared to the half-link levers 70a, 70b, the widths of the half-link levers 700a, 700b of the comparative example become shorter to the extent of the length between the rotation axes Xa, Xb.

Therefore, in a case where the half-link levers 70a, 70b of this embodiment are oscillated at an angle θ, the amount of displacement H of the half-link levers 70a, 70b in the arrow directions Z1, Z2 becomes greater compared to a case where the half-link levers 700a, 700b of the comparative example are oscillated at an angle θ. Thereby, in a case of moving the half-link levers for a predetermined displacement amount, the rotation angle θ of the first link lever 70 of this embodiment can be smaller than the rotation angle θ of the first link lever 700 of the comparative example.

Accordingly, even in a case where a stroke of the switch keys 11-16 is small, the first link lever 70 can be positively moved. Further, operation load can be reduced by increasing the width of the half-link levers 70a, 70b, and the durability of the first link lever 70 can be increased.

The first link lever 70 having the above-described configuration exerts pressure to the second link lever 72 in a case where the half-link lever 70a is oscillated in the arrow direction A1 against a biasing force of the link spring 71 when pressure is exerted to the switch keys 11-13. Thereby, the second link lever 72 oscillates in the arrow direction A3.

Further, pressure is exerted to the second link lever 72 by the half-link lever 70b even in a case where the half-link lever 70b is oscillated in the arrow direction A2 against the biasing force of the link spring 71. Accordingly, in this case also, the second link lever 72 oscillates in the arrow direction A3.

In this case, the load of the pressing force required for operating the switch keys 11-16 is determined according to a spring force of the link spring 71 provided between the pair of half-link levers 70a, 70b of the first link lever 70 and a spring force of the spring 91 provided in the coupling members 83-87. In this embodiment, the link spring 71 and the spring 91 are set with a weak spring force, respectively. Thereby, the amount of load of the pressing force required for operating (exerting pressure to) the switch keys 11-16 can be reduced, and operability can be improved.

The above-described first and second link levers 70, 72 are provided between the base 81 and the upper cover 82. In a state where the first and second link levers 70, 72 are arranged, a tip operation part 723 formed on a tip of the second link lever 72 faces the operation part 55 of the power generation apparatus 30D.

In the power generation switch apparatus 1E of this embodiment, only a single power generation apparatus 30D is provided. The power generation apparatus 30D is also provided in the switch case 80.

Figure 23:
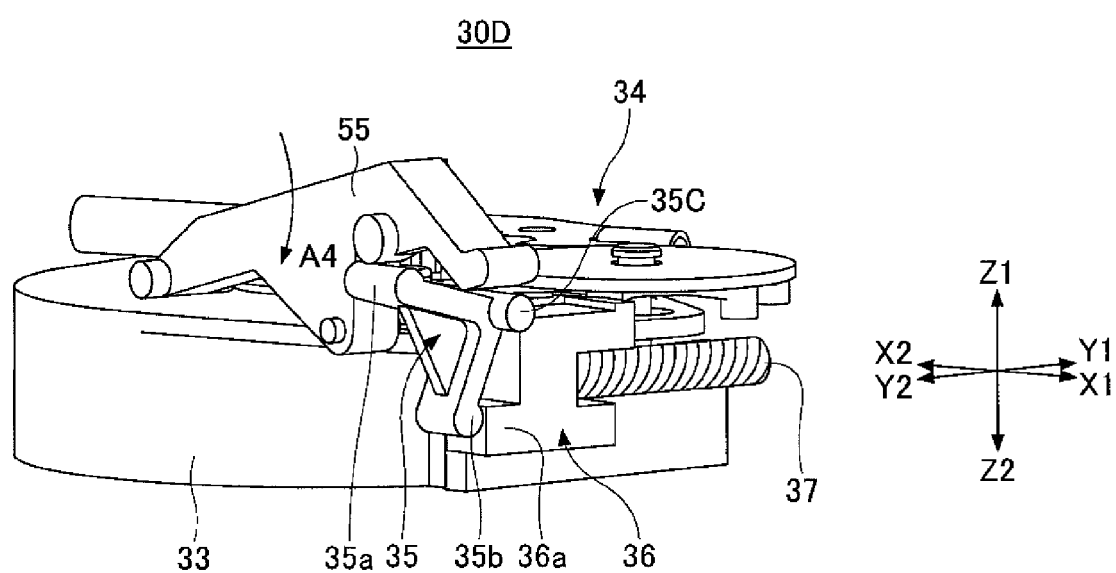
FIG. 23 is a perspective view of a power generation apparatus.

FIGS. 22 and 23 illustrate the power generation switch apparatus 1E of this embodiment. In the power generation apparatus 30D, the power generator 33 performs power generation by oscillating the second link lever 72 in the arrow direction A3 and operating the operation part 55 in the arrow direction A4.

The power generation apparatus 30D includes the power generator 33 and a power generator drive mechanism 34. The operation part 55 drives the power generator drive mechanism 34 by oscillating in the arrow direction A4. The power generator drive mechanism 34 transmits the drive force to the power generator 33. Thereby, the power generator 33 is driven to perform power generation.

The power generator drive mechanism 34 includes, for example, an L-shaped arm 35 and a direct-acting drive member 36. The L-shaped arm 35 includes a first arm part 35a and a second arm part 35b. The first and second arm parts 35a, 35b extend to form an L-shape having the shaft part 35c as its center. The shaft part 35c is rotatably supported by the housing 31.

The L-shaped arm 35 having the above-described configuration is formed to engage the first arm part 35a to the operation part 55 and engage the second arm part 35b to the direct-acting drive member 36.

The direct-acting drive member 36 is attached to the housing 31 to be directly driven in the arrow direction Y1, Y2. A coil spring 37 is provided on a Y1 side of the housing 31. The coil spring 37 biases the direct-acting drive member 36 in the arrow direction Y2. A projecting part 36a is formed on a Y2 side of the direct-acting drive member 36. The second arm part 35b of the L-shaped arm 35 engages the projecting part 36a.

FIG. 22(A) illustrates a state before the operation part 55 is operated (i.e. a state where the switch keys 11-16 are not operated, hereinafter referred to as "pre-operation state"). In the pre-operation state, the L-shaped arm 35 rotates in a clockwise direction in the drawing (arrow direction E1 in the drawing). Therefore, the direct-acting drive member 36 is moved in the arrow direction Y2 by the elastic force of the coil spring 37.

When the switch keys 11-16 are operated from the pre-operation state, the operation part 55 moves in the arrow direction A4 and exerts pressure to the first arm part 35a. Thereby, the L-shaped arm 35 rotates about the shaft part 35c in a counter-clockwise direction (arrow direction E2 in the drawing). The second arm part 35b engages the projecting part 36a of the direct-acting drive member 36. Accordingly, by moving the L-shaped arm 35 in the arrow direction E2, the direct-acting drive member 36 is directly driven against the elastic bias force of the coil spring 37 in the arrow direction Y1.

The power generator drive mechanism 34 including the L-shaped arm 35 and the direct-acting drive member 36 is connected to the power generator 33. Accordingly, the moving force (driving force) of the direct-acting drive member 36 is transmitted to the power generator 33 via the power generator drive mechanism 34, and the power generator 33 is driven to perform power generation.

In performing power generation with the power generator 33, the operation force of the operation part 55 in the arrow direction Z2 (arrow direction A4) is preferred to be small. Thereby, the operation force during the operation of the switch keys 11-16 can be reduced. Further, the travel distance of the operation part 55 (i.e. stroke of the operation part 55) in the arrow direction Z2 (arrow direction A4) is preferred to be small. Thereby, the amount for pressing the switch keys 11-16 can be reduced. Thus, operability can be improved.

In this embodiment, because the operation force of the operation part 55 in the arrow direction Z2 (arrow direction A4) is small, the length of the second arm part 35b (indicated with an arrow M1 in FIG. 24(A)) can be set to be shorter than the length of the first arm part 35a (indicated with an arrow M2 in FIG. 24(B)) (M1<M2). Assuming that the elastic bias force of the coil spring 37 is the same, the direct-acting drive member 36 can be positively directly driven by using the configuration of this embodiment even if the operation force of the first arm part 35a is small compared to a case of forming each of the arm parts 35a, 35b with the same lengths.

However, although the operation force of the first arm part 35a can be reduced by making the length M1 of the second arm part 35b shorter than the length M2 of the first arm part 35a, the traveling amount of the direct-acting drive member 36 in the arrow direction Y1 is reduced. Therefore, in order for the direct-acting drive member 36 to travel a predetermined distance required for power generation, it is necessary to increase the travel distance of the first arm part 35a (stroke amount) in the arrow direction Z2 (arrow direction A4).

In this embodiment, in order to reduce the operation force of the first arm part 35a and shorten the stroke amount of the first arm part 35a, the projecting part 36a is formed in the direct-acting drive member 36, and the second arm part 35b is inclined toward a counter-clockwise direction at a predetermined angle relative to a vertical downward direction in the pre-operation state. Next, the reason that the direct-acting drive member 36 is able to travel a predetermined distance required for power generation while shortening the stroke amount of the first arm part 35a is described with reference to FIGS. 24-26.

Figure 24:
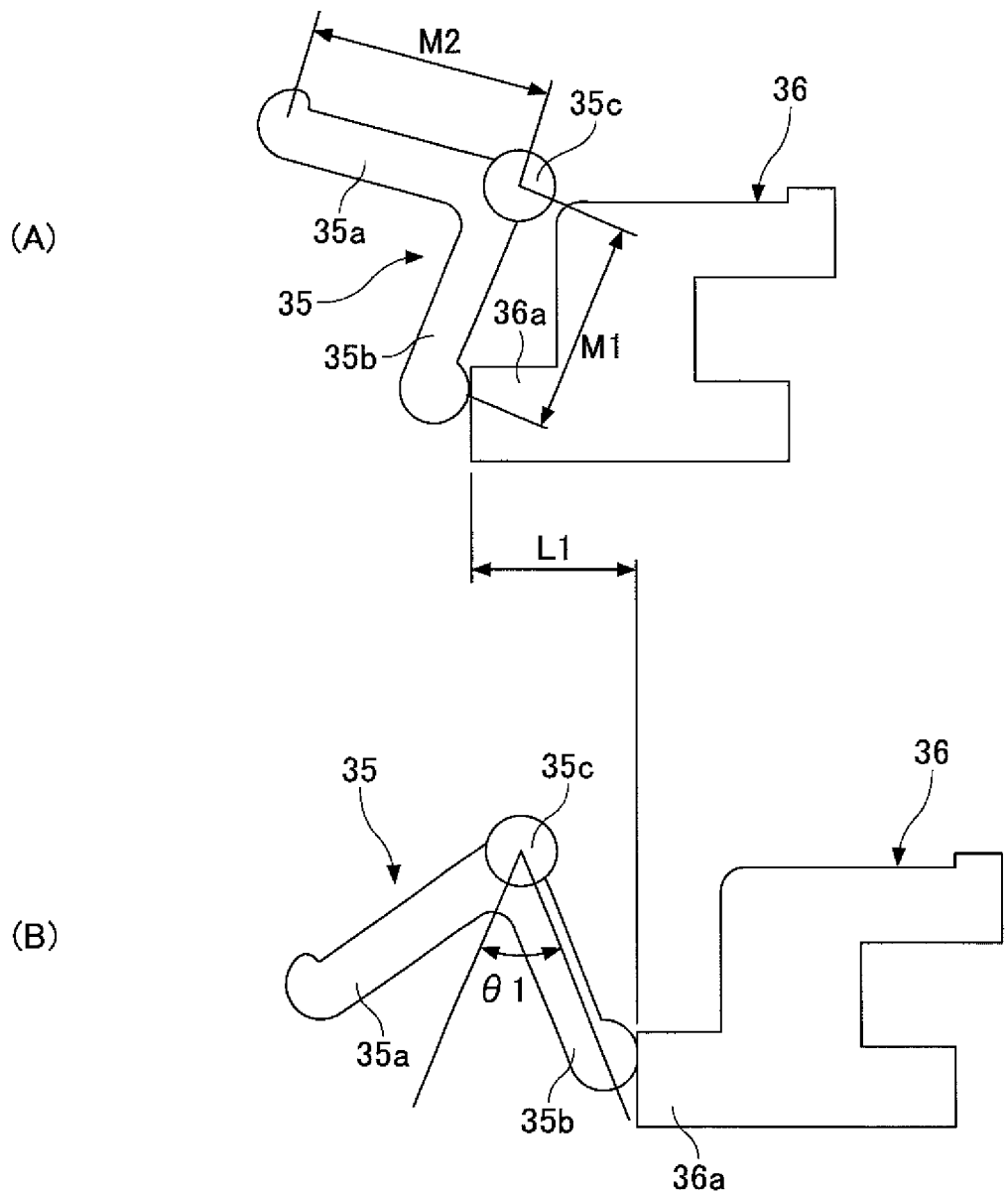
FIGS. 24(A) and 24(B) are diagrams for describing movement of an L-shaped arm and a direct-acting driving member provided in a power generation apparatus.
Figure 25:
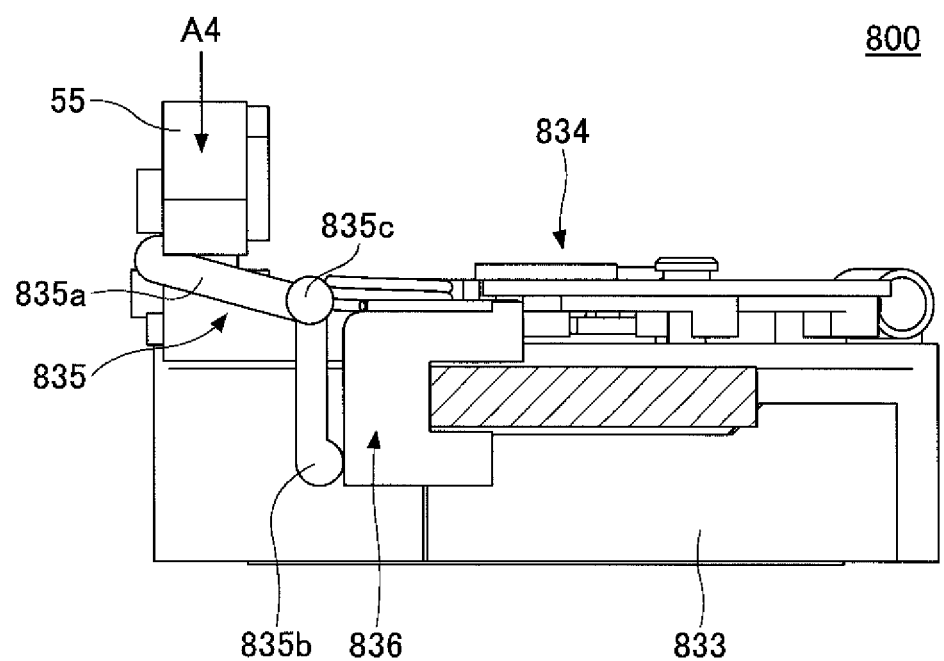
FIG. 25 is a front view of a power generation apparatus of a reference example.
Figure 26:
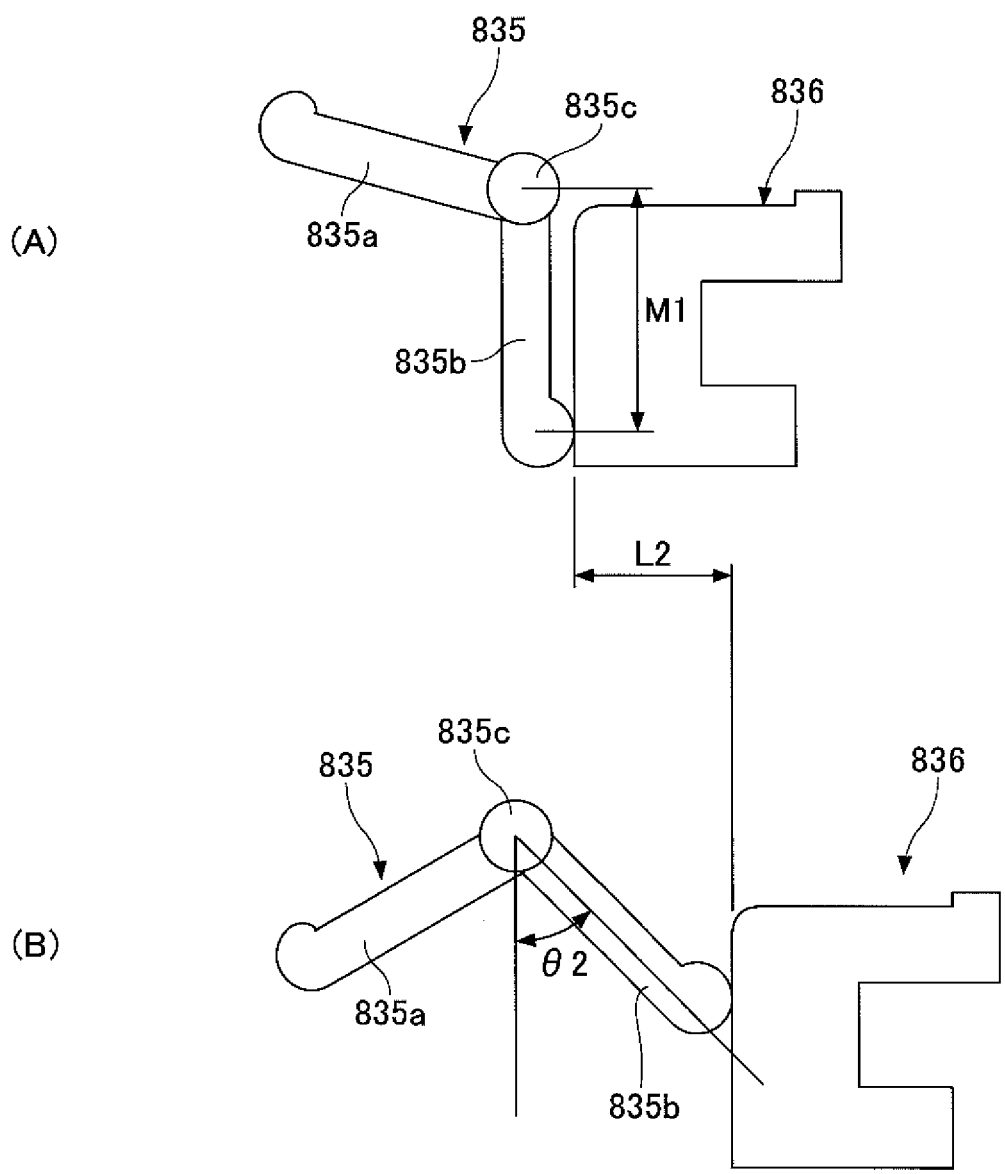
FIGS. 26(A) and 26(B) are diagrams for describing movement of an L-shaped arm and a direct-acting driving member provided in the power generation apparatus of the reference example.

FIG. 24 is an enlarged view of the L-shaped arm 35 and the direct-acting drive member 36. FIG. 24(A) illustrates a pre-operation state, and FIG. 24(B) illustrates a post-operation state. FIG. 25 illustrates a power generation apparatus 800 of a reference example. FIG. 26 is an enlarged view of an L-shaped arm 835 and a direct-acting drive member 836 provided in the power generation apparatus 800. FIG. 26(A) illustrates a pre-operation state, and FIG. 26(B) illustrates a post-operation state.

The power generation apparatus 800 of the reference example illustrated in FIG. 25 has substantially the same configuration as that of the power generation apparatus 30D of this embodiment illustrated in FIG. 22 except that no projecting part 36a is provided in the direct-acting drive member 836 and a second arm part 835b of the L-shaped arm 835 extends vertically downward in the pre-operation state.

In the power generation apparatus 30D of this embodiment, the direct-acting drive member 36 is assumed to travel a distance L1 when the L-shaped arm 35 is rotated at an angle θ1. Further, in the power generation apparatus 800 of the reference example, the direct-acting drive member 836 is assumed to travel a distance L2 when the L-shaped arm 835 is rotated at an angle θ2. Further, the length of the second arm part 35b of this embodiment and the length of the second arm part 835b of the reference example are both assumed to be the same length M1. Further, the length of the first arm part 35a and the length of the first arm part 835a are assumed to be the same.

$$L1 = 2 \times M1 \times \sin(\theta 1/2) \quad (1)$$

$$L2 = M1 \times \sin \theta 2 \quad (2)$$

The following L1 and L2 are obtained in a case supposing that the L-shaped arm 35 and the L-shaped arm 835 are both rotated at a same angle (θ1=θ2=60°).

$$L1 = 2 \times M1 \times \sin 30° = M1 \quad (3)$$

$$L2 = M1 \times \sin 60° = (\sqrt{3}/2) \times M1 \quad (4)$$

Therefore, according to the expression (3) and the expression (4), L1>L2. That is, in a case where the L-shaped arms 35, 835 are rotated with the same angle, it can be understood that the power generation apparatus 30D of this embodiment allows the direct-acting drive member 36 to be directly driven for a longer distance compared to that of the power generation apparatus 800 of the comparative example. Further, the rotation angles of the L-shaped arms 35, 835 correlate with the stroke amounts of the first arm parts 35a, 835a (corresponding to the travel distance of the operation part 55 in the arrow direction Z2).

Therefore, with this embodiment where the second arm part 35b is configured to be inclined toward a counter-clockwise direction at a predetermined angle relative to a vertical downward direction in the pre-operation state, the direct-acting drive member 36 can be positively moved a predetermined necessary distance by rotating the L-shaped arm 35 for a small amount (i.e. with a short stroke amount of the first arm part 35a). Thereby, operation can be positively performed when operating the switch keys 11-16 even if the amount of pressure to be exerted to the switch keys 11-16 is reduced. Thus, operability can be improved.

The switch substrate 60 is a circuit substrate having the switches SW1-SW5 provided on its upper surface. The switch SW1 is arranged in a manner facing the coupling member 83. Similarly, the switch SW2 is arranged in a manner facing the coupling member 84. The switch SW4 is arranged in a manner facing the coupling member 86. The switch SW5 is arranged in a manner facing the coupling member 87. When the pins of the coupling members 83-87 are lowered by the operation of the switch keys 12-16, the corresponding switches SW1-SW5 are switched from an OFF state to an ON state.

It is to be noted that the first and second link levers 70, 72 are provided between the coupling members 83-87 and the switch substrate 60. Grooves 93 for allowing the pins of the coupling members 83-87 to travel are formed in predetermined positions in the first and second link levers 70, 72. Therefore, the first and second link levers 70,72 do not prevent the pins of the coupling members 83-87 from traveling.

Next, the movements of the power generation switch apparatus 1E including the above-described configuration are described.

FIG. 14 illustrates an operated state of the switch key 11. No coupling member or switches SW are provided at a lower part of the switch key 11. However, the operation protrusion 11b is provided at the lower part of the switch key 11. When the switch key 11 is operated by exerting pressure thereto, the operation protrusion 11b contacts the half-link lever 70a of the first link lever 70, and the half-link lever 70a is biased downward.

Thus, by operating the switch key 11, first, the half-link lever 70a is oscillated in the arrow direction A1 illustrated in FIG. 14. Thereby, the second link lever 72 oscillates in the arrow direction A3. Then, by oscillating the second link lever 72 in the arrow direction A3, the tip operation part 72B biases the operation part 55.

Thereby, the operation part 55 travels in the arrow direction A4, and the power generation apparatus 30D performs power generation. The operation of the switch key 11 can be detected by the power generation of the power generation apparatus 30D in a state where the switches SW1-SW5 are OFF.

FIG. 15 illustrates an operated state of the switch key 13. The operation protrusion 13b and the coupling member 84 are provided at a lower part of the switch key 13.

Accordingly, when the switch key 13 is operated by exerting pressure thereto, the switch key 13 engages the pin of the coupling member 84 and biases the pin downward. The switch SW2 is provided on the switch substrate 60 in a manner facing the coupling member 84. Accordingly, when the pin of the coupling member 84 is lowered by the operation of the switch key 13, the switch SW2 is operated to switch from an OFF state to an ON state.

Meanwhile, by operating the switch key 13, the operation protrusion 13b formed in the lower part of the switch key 13 contacts the half-link lever 70a of the first link lever 70 and biases the half-link lever 70a downward. Thereby, the half-link lever 70a is oscillated in the arrow direction A1 illustrated in FIG. 14. Thereby, the second link lever 72 oscillates in the arrow direction A3. Then, by oscillating the second link lever 72 in the arrow direction A3, the tip operation part 72B biases the control part 55.

Thus, in the case where the switch key 13 is operated, the operation part 55 travels in the arrow direction A4, and the power generation apparatus 30D performs power generation. Therefore, the operation of the switch key 13 can be detected by the power generation of the power generation apparatus 30D in a state where the switch SW2 is ON.

The movement of the power generation switch apparatus 1E in a case where the switch key 12 is operated is substantially the same as the movement in the case where the switch key 13 is operated except for the switch SW2 replaced by the switch SW1. Further, the movement of the power generation switch apparatus 1E in a case where the switch keys 14-16 are operated is substantially the same as the movement in the case where the switch keys 11-13 are operated except that the switch to be switched on is one of the switches SW3-SW5 and that the second link lever 72 is biased by oscillating the half-link lever 70*b* in the arrow direction A2 instead of the half-link lever 70*a* when the switches 14-16 are operated.

Accordingly, similar to the above-described embodiments, the power generation switch apparatus 1E of the fifth embodiment can reduced the number of switches SW compared to a conventional example. Further, the height of the entire apparatus including the switch case 80 can be reduced by positioning the power generation apparatus 30D in a laid state inside the switch case 80.

The above-described power generation switch apparatus 1E may be used as, for example, a steering switch of the steering wheel 45. In this case, it is provided in a steering spoke 46. A predetermined part at an upper end of the switch keys 11-13 projects from a garnish of the steering spoke 46. The amount in which the switch keys 11-16 project from the garnish is set to prevent the garnish from contacting a finger of a user during operation of the switch keys 11-16. With this configuration, operability of the switch keys 11-16 can be improved, and inadvertent operation can be prevented.

Recesses are formed between the switch key 11 and the switch key 14, between the switch key 12 and the switch key 15, and between the switch key 13 and the switch key 16. In this embodiment, the depth of the recess is set to be great. However, even with such configuration, the operability of the switch keys 11-16 can be improved, and inadvertent operation can be prevented.

In the switch keys 11-16, the heights of the switch keys 11-13 arranged in the arrow directions X1, X2 do not necessarily need to be the same as the heights of the switch keys 14-16 arranged parallel with the switch keys 11-13 but may be different from each other. For example, the switch keys 14-16 positioned at an upper part in FIG. 14 may be higher than the switch keys 11-13 positioned at a lower part in FIG. 14. Accordingly, by adjusting the heights of the switch keys 11-16 with respect to the surface of the steering spoke 46 provided with the power generation switch apparatus 1E, operability of the power generation switch apparatus 1E can be improved.

FIGS. 18-21 illustrate a power generation switch apparatus 1F according to the sixth embodiment of the present invention.

Figure 18:
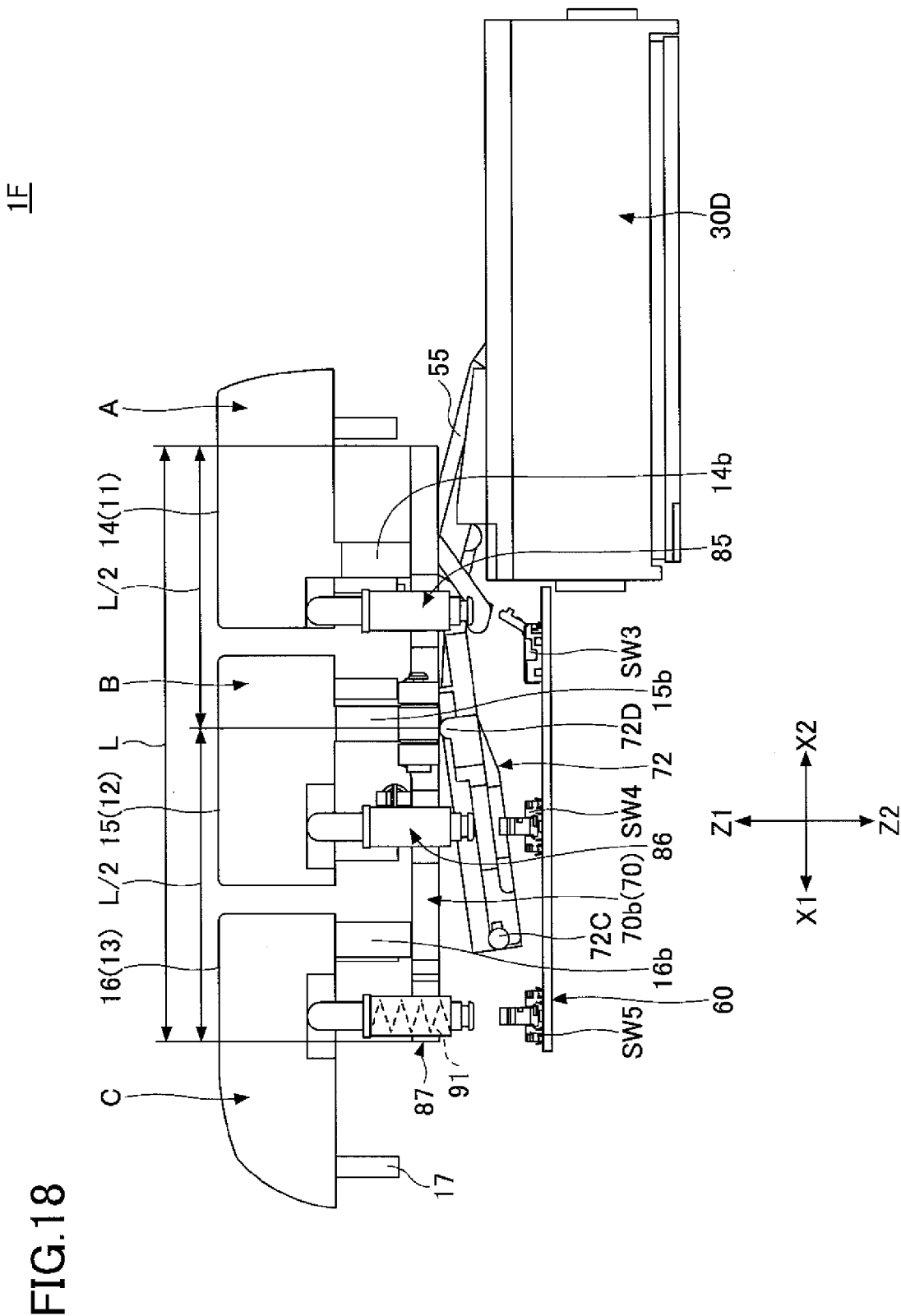
FIG. 18 is a side view of a power generation switch apparatus of a sixth embodiment.
Figure 19:
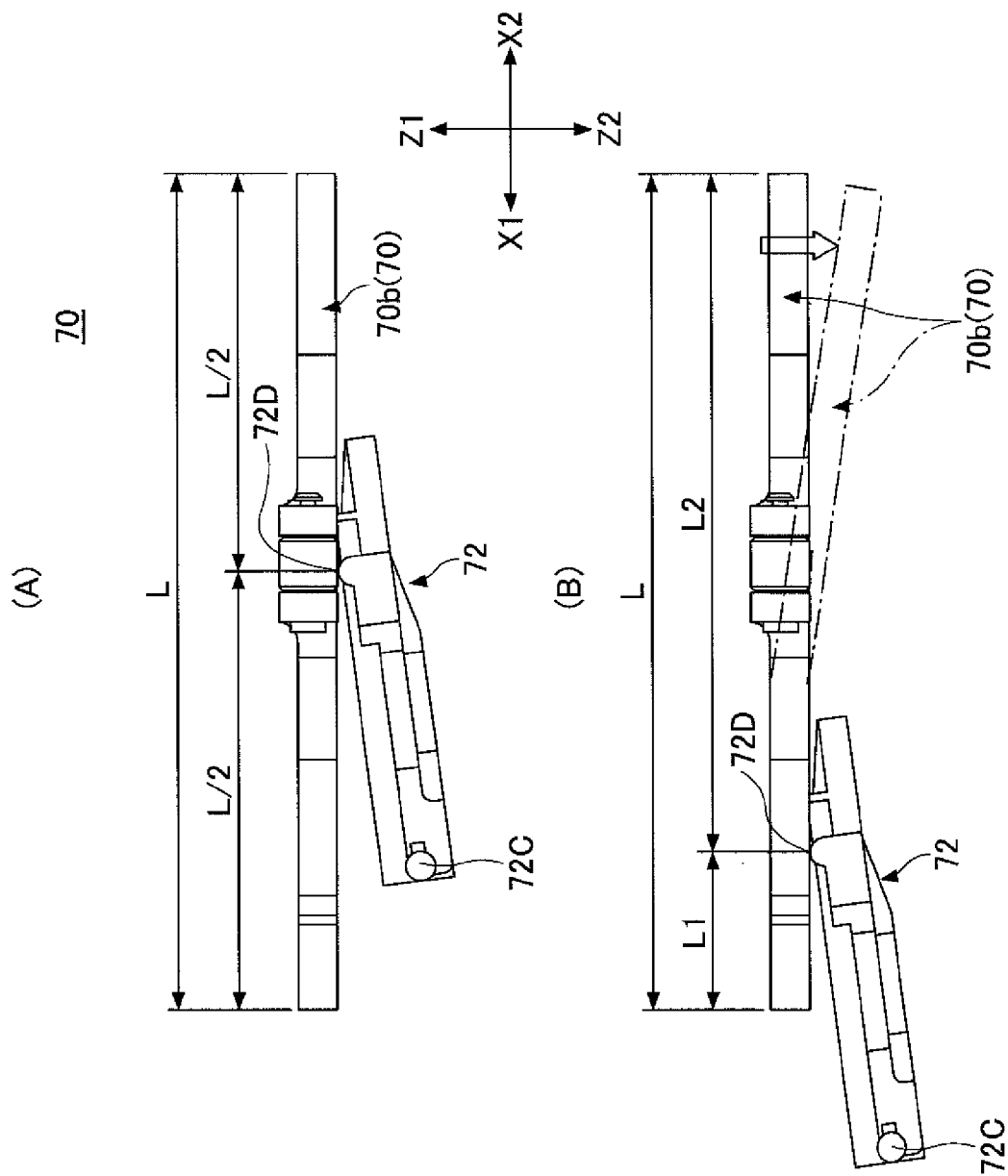
FIG. 19(A) is an enlarged perspective view of first and second link levers.
FIG. 19(B) is a perspective view of first and second link levers of a comparative example.
Figure 20:
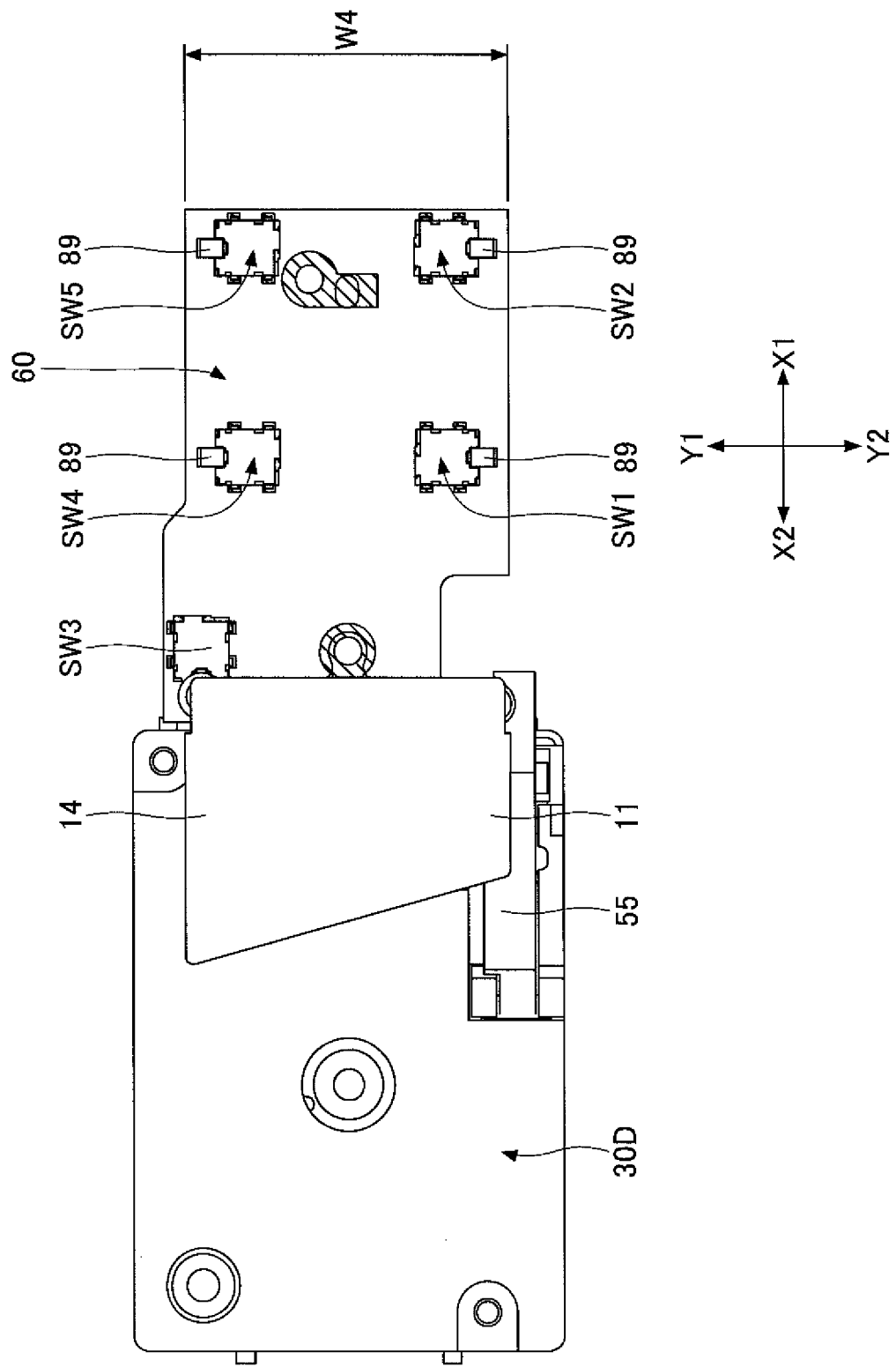
FIG. 20 is an enlarged plan view of a switch substrate.
Figure 21:
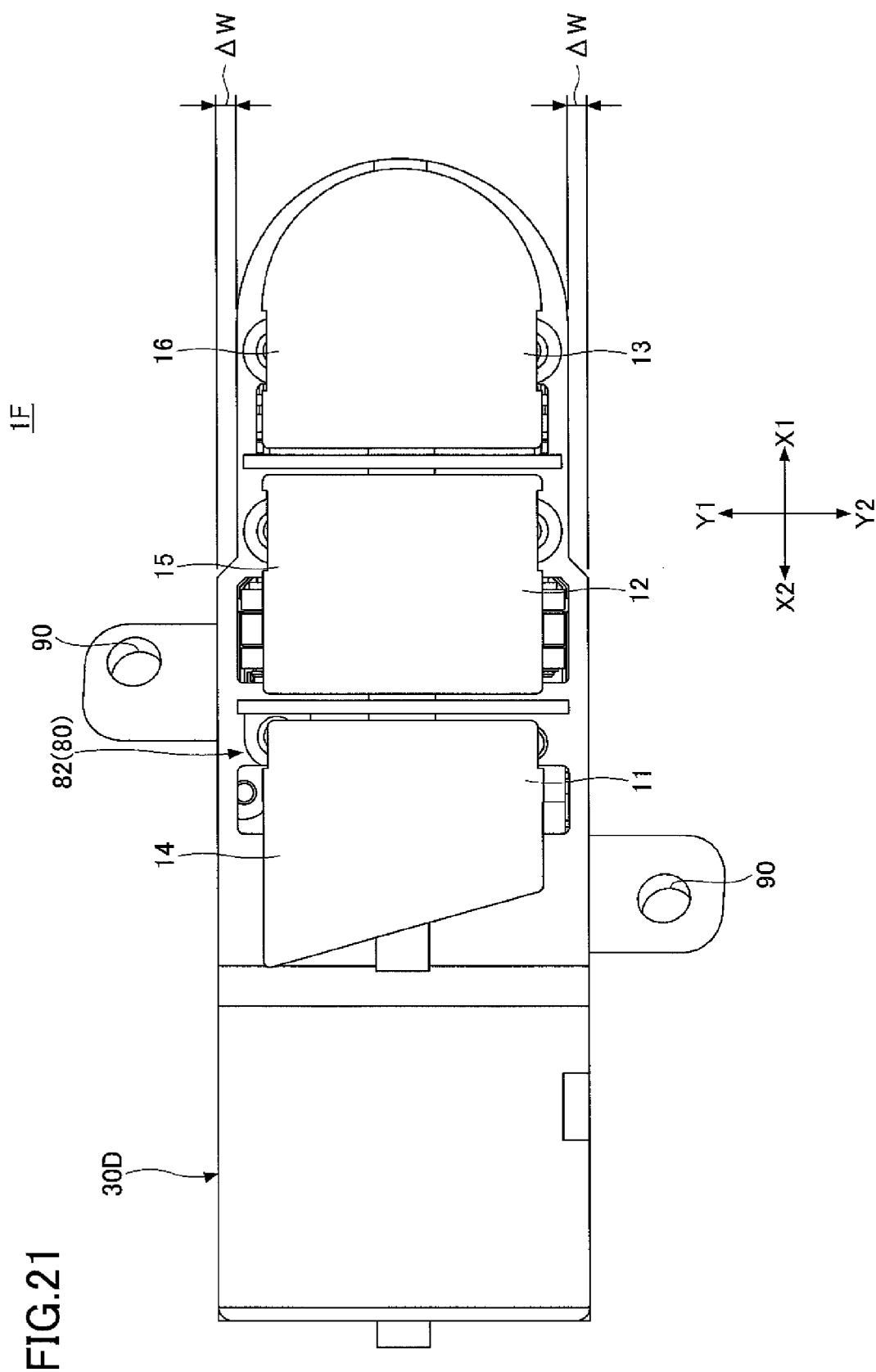
FIG. 21 is a plan view of the power generation switch apparatus of the sixth embodiment.

FIG. 18 is a side view of the power generation switch apparatus 1F. FIG. 19 is an enlarged side view of the first and second link levers 70, 72. FIG. 20 is an enlarged plan view of the switch substrate 60. FIG. 21 is a plan view of the power generation switch apparatus 1F. It is to be noted that the switch case 80 is omitted from the drawings except for FIG. 21.

Similar to the power generation switch apparatus 1E of the fifth embodiment, the power generation switch apparatus 1F of the sixth embodiment has the half-link levers 70*a*, 70*b* of the link lever 70 oscillated when the switch keys 11-16 are operated. By the oscillation of the half-link levers 70*a*, 70*b*, pressure is exerted to the second link lever 72. Accordingly, the power generation apparatus 30D performs power generation.

A pair of engagement parts 72D projecting upward are formed one on each side part of the second link lever 72. The engagement part 72D engages the half-link lever 70*a*, and the engagement part 72D engages the half-link lever 70*b*. Accordingly, during the oscillating of the half-link levers 70*a*, 70*b*, the half-link levers 70*a*, 70*b* contact and exert pressure to the engagement parts 72D. Thereby, the second link lever 72 is oscillated.

It is to be noted that only the half-link lever 70*b* positioned at the front of FIG. 18 and the engagement part 72D formed thereto are illustrated in FIG. 18. The half-link lever 70*a* positioned at the rear of FIG. 18 and the engagement 72D formed thereto are not illustrated in FIG. 18. However, the half-link lever 70*a* and its engagement part 72D move in the same manner as the half-link lever 70*b* and the engagement part 72D formed thereto.

In this embodiment, the positions in which the engagement parts 72D (second link lever 72) engage the half-link levers 70*a*, 70*b* (first link lever 70) are set to be the center position of the half-link levers 70*a*, 70*b*, respectively. Accordingly, assuming that the entire length of each of the half-link levers 70*a*, 70*b* is L, the distance from a position at which the engagement part 72D contacts each half-link levers 70*a*, 70*b* to an end part of each half-link levers 70*a*, 70*b* is L/2 as illustrated in FIG. 18 and FIG. 19(A).

With the configuration of this embodiment where the engagement part 72D contacts each of the half-link levers 70*a*, 70*b* at their center positions, the stroke for exerting pressure and operating the switch keys 11-16 can be shortened. This is described below with reference to FIG. 19.

In the comparative example illustrated in FIG. 19(B), the engagement part 720 of the second link lever 72 and the half-link levers 70*a*, 70*b* (first link lever 70) engage at a position deviated in the arrow direction X1 from the center positions of the half-link levers 70*a*, 70*b* (first link lever 70). With this configuration, the distance (L1) from the contact position of the engagement part 72D to the end parts of the half-link levers 70*a*, 70*b* in the arrow direction X1 and the distance (L2) from the contact position of the engagement part 720 to the end parts of the half-link levers 70*a*, 70*b* in the arrow direction X2 are different (L1<L2).

In the comparative example, it is assumed that a switch key is operated, and pressing force is exerted to the end parts on the X2 direction side of the half-link levers 70*a*, 70*b*. In this case, the positions at which the engagement parts 72D engage the half-link levers 70*a*, 70*b* are separated from the position at which pressure is exerted. Therefore, bending may occur in the half-link levers 70*a*, 70*b* as illustrated with a dot-dash line in FIG. 19(B).

When bending of the half-link levers 70*a*, 70*b* (first link lever 70) occurs when a switch key is being operated, the operation part 55 cannot be positively operated in a case where the stroke amount of the switch key is short. Thus, the power generation apparatus 30D may be unable to appropriately generate power.

On the other hand, with this embodiment, the engagement parts 72D engage each of the half-link levers 70*a*, 70*b* at their center positions. Therefore, compared to the comparative example, the position of the half-link lever 70*a*, 70*b* (first link lever 70) at which pressure is exerted when the switch key 11-16 is operated can be brought closer to the position at which the engagement parts 72D engage the half-link levers 70*a*, 70*b* (first link lever 70).

Accordingly, the half-link levers 70*a*, 70*b* can be prevented from bending when the switch keys 11-16 are operated. Further, the stroke amount of the switch keys 11-16 can be reduced. Accordingly, operability of the switch keys 11-16 can be improved in addition to enabling the power generation apparatus 30D to positively perform power generation when the switches are operated.

Further, with this embodiment, the operation protrusions 11*b*-16*b* (operation protrusions 11*b*-13*b* not illustrated) formed in each of the switch keys 11-16 exert pressure to the half-link levers 70*a*, 70*b* in the vicinity of the engagement positions between the engagement parts 72D and the half-link levers 70*a*, 70*b*.

That is, the operation protrusions 11b, 14b are positioned in the switch key A toward the arrow direction X1 in the drawing. Further, the operation protrusions 12b, 15b are provided in positions corresponding to the engagement positions between the engagement parts 72D and the half-link levers 70a, 70b. Further, the operation protrusions 13b, 16b are positioned in the switch key C toward the arrow direction X2 in the drawing.

By setting the positions of each of the operation protrusions 11b-16b, the engagement positions between the engagement parts 72D and the half-link levers 70a, 70b can be brought closer to the positions at which the respective operation protrusions 11b-16b exert pressure to the half-link levers 70a, 70b. This also prevents bending of the half-link levers 70a, 70b from occurring. Accordingly, with this configuration, operability of the switch keys 11-16 can be improved while enabling the power generation apparatus 30D to positively perform power generation.

Next, the switches SW1, SW2, SW4, and SW5 provided in the switch substrate 60 are described.

As illustrated in FIG. 20, the switches SW1, SW2, SW4, and SW5 are arranged so that a switch knob 89 of each of the switches SW1, SW2, SW4, and SW5 is positioned on a side toward a side edge of the switch substrate 60. More specifically, the switch knobs 89 of the switches SW1, SW2 are arranged on a side toward the arrow direction Y2, and the switch knobs 89 of the switches SW4, SW5 are arranged on a side toward the arrow direction Y1.

In the power generation switch apparatus 1E of the fifth embodiment illustrated in FIG. 13, switch knobs of the switches SW1, SW2, SW4, and SW5 are arranged facing a longitudinal direction of the switch substrate 60 (X1, X2 directions in the drawing). When mounting the switches SW1-SW5 on the switch substrate 60, a process of soldering the terminals of the switches SW1-SW5 to the wirings formed on the switch substrate 60 is required. Therefore, it becomes necessary to provide a mounting area for performing soldering or the like at both side parts of the switch substrate 60 on which the switches SW1-SW5 are to be mounted.

In the fifth embodiment illustrated in FIG. 13, the side parts of the switches SW1-SW5 are positioned on the side toward the side edges of the switch substrate 60. Therefore, in order to ensure the above-described mounting area, the switches SW1, SW2, SW4, and SW5 are to be positioned inward from the side edge of the switch substrate 60 to the extent of the mounting area.

On the other hand, with the sixth embodiment illustrated in. FIG. 20, each of the switch knobs 89 of the switches SW1, SW2, SW4, and SW5 is arranged to be positioned toward the side edge of the switch substrate 60. Thereby, the mounting area can be distanced from the side edge. To this extent, size-reduction of the switch substrate 60 can be achieved. More specifically, the width W4 (illustrated with arrows in FIG. 20) of the switch substrate 60 of this embodiment can be reduced compared to the width W5 (illustrated with arrows in FIG. 11) of the switch substrate 60 of the fifth embodiment illustrated in FIG. 13.

FIG. 21 is a plan view of the power generation switch apparatus 1F of this embodiment. With this embodiment, the switch knob 89 of each of the switches SW1, SW2, SW4, and SW5 is arranged toward the side edge of the switch substrate 60 as described above. Thereby, size-reduction of the switch substrate 60 is achieved.

In addition, the upper cover 82 (switch case 80), which is provided in a manner covering the switch substrate 60, may also be size-reduced to the extent of the dimension illustrated with arrows Δw in the drawing. Therefore, even in a case where the power generation switch apparatus 1F is provided as the steering switch 46 of the steering wheel 45 having a narrow installment space as illustrated in FIG. 4, the power generation switch apparatus 1F can be positively arranged in the steering wheel 45.

Similar to the power generation switch apparatuses 1A-1D of the above-described embodiments, the power generation switch apparatuses 1E, 1F of the fifth and sixth embodiments are also configured so that the timing of switching on each of the switches is earlier than the timing of the power generation performed by the power generation apparatus 300.

Further, the present invention is not limited to these embodiments, but variations and modifications may be made without departing from the scope of the present invention.

The present application is based on Japanese Priority Application Nos. 2012-066411 and 2012-219864 filed on Mar. 22, 2012 and Oct. 1, 2012, with the Japanese Patent Office, the entire contents of which are hereby incorporated by reference.

INDUSTRIAL APPLICABILITY

The present invention is applicable to a power generation switch apparatus including multiple switch keys.

EXPLANATION OF REFERENCE NUMERALS 1A-1F power generation switch apparatus
10 switch mechanism
11-16 switch key
11a-16a flange part
11b-16b operation protrusion
11c-16c shaft part
20, 21 coupling arm
20a, 21a target operation surface
20b, 21b operation protrusion
20c, 21c shaft part
30, 30A-30D power generation apparatus
31 housing
32, 50 operation lever
32A, 50A first operation part
32B, 50B second operation part
33 power generator
40 circuit substrate
41 switch control circuit
42 transmission circuit
43 antenna
45 steering wheel
46 steering switch
51A first extending part
51B second extending part
55 operation part
60 switch substrate
61 semiconductor chip
62-65 switch pattern
66-69 switch electrode
70 first link lever
70a, 70b half-link lever
71 link spring
72 second link lever
80 switch case
83-87 coupling member
SW1-SW5 switch

The invention claimed is:

1. A power generation switch apparatus comprising:
a plurality of switch keys;
a power generation apparatus that is driven to perform power generation by an operation force applied to the switch keys;
a plurality of switches being supplied with an electric power generated by the power generation apparatus and performing a switching movement by an operation of the switch keys; and
a switch signal transmission circuit being driven by the electric power from the power generation apparatus and outputting a plurality of switch signals that are different from each other in correspondence with the switching movement of the plurality of switches, the switch signal transmission circuit including a switch control circuit connected to the plurality of switch keys,
wherein the switch control circuit is configured to detect the operation of the plurality of switch keys based on a corresponding relationship between an on/off state of one or more switches of the plurality of switches and an on/off state of the power generation apparatus,
wherein the corresponding relationship is stored beforehand in the switch control circuit,
wherein the switch control circuit is configured to determine whether the one or more of the plurality of switch keys are on according to the corresponding relationship,
wherein the switch signal transmission circuit is configured to transmit the switch signal to an electronic device according to the on/off state of the one or more switches of the plurality of switches and the on/off state of the power generation apparatus, and
wherein the plurality of switches are configured to be switched before the power generation of the power generation apparatus.

2. The power generation switch apparatus as claimed in claim 1, further comprising:
a link mechanism including a coupling arm that couples the plurality of switch keys and the power generation apparatus;
wherein the electric power is generated by transmitting an operation force exerted to any one of the plurality of switch keys by way of the link mechanism and driving a power generator of the power generation apparatus.

3. The power generation switch apparatus as claimed in claim 1, wherein the plurality of switches include a substrate formed with switch patterns arranged in a manner facing the switch keys.

4. The power generation switch apparatus as claimed in claim 1, wherein one of the plurality of switches is installed in the power generation apparatus.

5. The power generation switch apparatus as claimed in claim 1, wherein only a single power generation apparatus is provided with respect to the plurality of the switches.

* * * * *